United States Patent
Kobayashi

(12)
(10) Patent No.: US 6,633,888 B1
(45) Date of Patent: Oct. 14, 2003

(54) METHOD AND APPARATUS FOR VISUALLY CREATING AND TESTING OBJECT ORIENTED COMPONENTS

(75) Inventor: Douglas Kobayashi, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/243,261

(22) Filed: Feb. 3, 1999

(51) Int. Cl.⁷ .............................................. G06F 17/00
(52) U.S. Cl. .................. 707/103 R; 707/102; 345/781; 709/313; 709/315
(58) Field of Search ............. 707/1–206; 345/778–788; 709/310–332

(56) References Cited

PUBLICATIONS

I–Kinetics, Genuine ComponentWare, "Migrating Legacy Systems To Components", Copyright 1997, 1998.*

* cited by examiner

Primary Examiner—David Jung
(74) Attorney, Agent, or Firm—Kudirka & Jobse, LLP

(57) ABSTRACT

In order to test component class code with a conventional visual builder, a proxy component is created for each method, including constructors, in the component class code, which proxy component encapsulates the parameters of that method. In particular, parameters associated with a method are represented by properties of the proxy component created for that method. When each proxy component is displayed on the GUI of the visual builder, its properties, and consequently, the parameters of the underlying method, are visually editable and can be bound visually to other component properties using, for example, a mechanism in a conventional visual builder which links objects. Exceptions which occur during operation of the method are treated as events and can be visually passed to other components. Therefore, a program can be visually constructed and parameterized for runtime operation. In order to actually run components to test them a universal transport application under control of the proxy components provides a mechanism for manipulating local or remote objects in a "component-oriented" manner directly from the visual builder.

21 Claims, 19 Drawing Sheets

METHOD AND APPARATUS FOR VISUALLY CREATING AND TESTING OBJECT ORIENTED COMPONENTS

FIELD OF THE INVENTION

The present invention relates, in general, to software programming systems and methods, and more specifically, to methods and apparatus for creating and testing object-oriented components with visual programming systems.

BACKGROUND OF THE INVENTION

Software is increasingly becoming a major portion of cost associated with computer systems because it is very "labor-intensive." Some of this cost is due to the effort involved in writing and debugging programs, other costs involve maintaining programs after they have been written. Accordingly, considerable effort has been expended in order to reduce the time and costs involved with writing, debugging and maintaining moderate and large software programs. Much of this effort has been related to developing programming languages and programming techniques which will allow programmers to build on or "reuse" programs and code segments that have been written by others.

Until very recently, software programming was heavily dominated by an approach referred to as "structured programming." Common software programming languages used in this approach were, and remain, BASIC, FORTRAN, and PASCAL. These are considered "higher order" languages that are written in human readable code and ultimately translated into machine or computer readable code by a compiler. Typically, structured programs have consisted of a combination of defined variables of specific data types, e.g. integer, real, and character, and a complimentary set of functions or routines which operate on these variables. Often, a program would include sub-routines which are smaller routines within a program or larger routine that carry out certain operations, e.g. printing data in a given output format. The emphasis to this approach was inputs—functions—outputs and they were often represented as flow-charts by the designers, which logically represented how the program functioned and branched into different functional paths. As an increasing number of programs became large (tens of thousands of lines of code and above) structured programs became increasingly complex and difficult to write, troubleshoot and maintain.

Flowcharts became unwieldy and the tracking of errors through permutations of variables, lengthy code, and a wide variety of program branches was time and cost intensive and often produced less than adequate results. Consequently, a new approach to software programming called Object-Oriented Design (OOD) or Object-Oriented Programming (OOP) emerged and has gained increasing popularity among software developers. OOP promised greater reuse and maintainability than its structured programming predecessor because of an emphasis on well-defined and self contained objects, rather than the structured programming emphasis on a proliferation of relatively loosely-related data manipulating functions and subroutines.

Object Oriented Programming techniques involve the definition, creation, use and destruction of "objects." These objects are software entities comprising data elements, or attributes, and methods, or functions, which manipulate the data elements. The attributes and related methods are treated by the software as an entity and can be created, used and destroyed as if they were a single item. Together, the attributes and methods enable objects to model virtually any real-world entity in terms of the entity's characteristics, represented by the data elements, and the entity's behavior, represented by data manipulation functions or methods. In this way, objects can model concrete things like people and computers, and they can also model abstract concepts like numbers or geometrical designs.

Objects are defined by creating "classes" which are not objects themselves, but which act as templates that instruct the computer how to construct the actual object. A class may, for example, specify the number and type of data variables and the steps involved in the methods which manipulate the object's data. When an object-oriented program is compiled, the class code is compiled into the program, but no objects exist. Therefore, none of the variables or data structures in the compiled program exist or have any memory allotted to them. An object is actually created by the program at runtime by means of a special function called a "constructor" which uses the corresponding class definition and additional information, such as arguments provided during object creation, to construct the object. Likewise, objects can be destroyed by a special function called a "destructor" or can be destroyed by special programs called "garbage collectors" when no longer needed. Objects may be used by using their data and invoking their methods. When an object is created at runtime, memory is allotted and data structures are created.

The principle benefits of object-oriented programming techniques arise out of three basic principles; encapsulation, polymorphism and inheritance. Specifically, objects can be designed to hide, or encapsulate, all, or a portion of, the internal data structure and the internal methods. More particularly, during program design, a program developer can define objects in which all or some of the attributes and all or some of the related methods are considered "private" or for use only by the object itself. Other data or methods can be declared "public" or available for use by other programs. Access to the private variables by other programs can be controlled by defining public methods for an object which access the object's private data. The public methods form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes, and the objects which are later created from them, as related. Specifically, classes may be designated as subclasses of other base classes. A subclass "inherits" and has access to all of the public functions of its base classes just as if these functions appeared in the subclass. Alternatively, a subclass can override some or all of its inherited methods or may modify some or all of its inherited methods merely by defining a new method with the same form. Overriding or modification does not alter the method in the base class, but merely modifies the use of the method in the subclass. The creation of a new subclass which has some of the functionality, with selective modification, of another class allows software developers to easily customize existing code to meet their particular needs.

Object-Oriented Programming languages include C++ and Java, as well as other languages. Each language has an express or implied "object model." Generally speaking, an object model is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object models are useful in contexts where all objects in a given system need to conform to a given protocol governing these parameters. Most object-oriented and object-based languages, including the Java programming language, do not specify true object models, but merely specify syntax and semantics of a basic object implementation without specifying the actual rules that unify object systems. Some object-oriented languages also incorporate the notion of "components" which are self-contained objects that perform a specified function or procedure. Components have a pre-defined interface that conforms to the object model of the underlying language and generally conform to a "component model" associated with the language.

In addition in order to using more efficient languages to reduce programming time, programming techniques have also been improved. Initially, program were written by typing lines of program statements. In the case of OOP programs, time was spent entering information with complicated syntax which was relatively standard from object to object. For example, for each constructor or method, a programmer normally wrote lines of code to marshal the data for each parameter of the method or constructor. The programmer then had to write a code line to call the method. In the case of methods, the programmer had to write code lines to capture and store the result of the method call. Finally, the programmer had to write code to deal with exceptions that occurred during the method call. This was tedious and led to a proliferation of typographical and spelling errors which increased the debugging time.

However, recently, "visual builders" are increasingly being used to expedite programming. A visual builder allows programs to be written with the help of a Graphical User Interface (GUI) and, under control of the GUI, the builder manipulates the "standard" code portions of the class and allow program developers to create class code by specifying the class properties and writing code for the class methods. Each class can be represented by an icon on the GUI. Generally, when an icon representing code for a class is selected, the class properties and class method names are retrieved and listed in a predetermined part of the display. The property values and method names can then be modified without actually examining and modifying the underlying code. In many cases it is possible to further select a method name to view the actual program code associated with the method.

The visual builder generates the actual class code for the object from the user specified properties and methods, including the code for marshaling data and handling results and exceptions. Many visual builders also contain pre-defined classes with predefined interfaces, which classes are called components. The components have properties and methods that can be customized or used to derive other component. These predefined components are generally represented as icons on a "palette", to which new components can be added. A programmer using the visual builder manipulates these components on the screen, or "in the active window" or "workspace", to create new component.

In some visual builders, the properties and methods of components can also be linked by the programmer using the visual builder interface to create a unique program. As a result, it is not necessary, to some degree, for a visual programmer to spend as much time entering code and debugging minor mistakes as a typical software developer who must enter the code text directly.

Examples of visual builders are disclosed in U.S. Pat. No. 5,546,519 to Berry, which illustrates describes a system and method for the visual programming of iterator link objects using a standard visual builder, whereby the user need not know the programming language itself. Properties of objects are also editable, usually via pull-down menus, and new objects can be added to the visual builder palette, primarily as a function of the visual builder itself.

In U.S. Pat. No. 5,642,511 to Chow et. al., a system and method are described for implementing an improved visual builder which allows a program developer to manipulate a hierarchical tree used to represent an OOP program. In the Chow patent a "proxy" tree comprised of proxy objects is built by using a visual builder to copy and edit user selected objects, thereby creating a new program.

Visual builders are attractive because they help to reduce programming time. When component classes are created with a visual builder, it is desirable to test them within the visual builder interface or application. This would increase programmer efficiency and reduce the time it takes to develop code using a visual builder, because it would allow the component class code to be tested before objects were created from it and incorporated into applications. However, current visual builders do not allow components to be tested in this efficient manner for several reasons. For example, current visual builders cannot specify at runtime parameters which are often required by methods in the component. Instead, conventional visual builders require objects to actually be built from the class code and then the objects are tested. If the object works, it is assumed that the class code is correct. Once a class is tested and shown to operate correctly, then it can be safely incorporated in to a visual builder palette for use by programmers.

Therefore, a need exists for a method and apparatus for compiling and testing newly created component classes within the visual builder interface. A need exists for visually creating, editing and testing composite component classes, including visually editing properties and associating methods among component classes within the composite component class.

SUMMARY OF THE INVENTION

In accordance with one illustrative embodiment, a proxy component is created for each method, including constructors, in the component class code, which proxy component encapsulates the parameters of that method. In particular, parameters associated with a method are represented by properties of the proxy component created for that method. When each proxy component is displayed on the GUI of a conventional visual builder, its properties, and consequently, the parameters of the underlying method, are visually editable and can be bound visually to other component properties using, for example, a mechanism in a conventional visual builder which links objects. Exceptions which occur during operation of the method are treated as events and can be visually passed to other components. Therefore, a program can be visually constructed and parameterized for runtime operation.

In order to actually run components to test them in accordance with one embodiment, an inventive universal transport application provides a mechanism for manipulating local or remote objects in a "component-oriented" manner directly from the visual builder. Essentially, the universal transport API is an object request broker which is controlled by proxy components and can be used without manually wrapping the underlying classes. The universal transport application can be used whether the underlying classes are local or remote and even if the classes do not conform to either the Remote Method Invocation (RMI) or the Common Object Request Broker Architecture (CORBA) specifications.

BRIEF DESCRIPTION OF THE DRAWINGS

The above and further advantages of the invention may be better understood by referring to the following description in conjunction with the accompanying figures, described below.

DETAILED DESCRIPTION OF THE ILLUSTRATIVE EMBODIMENT

Figure 1:
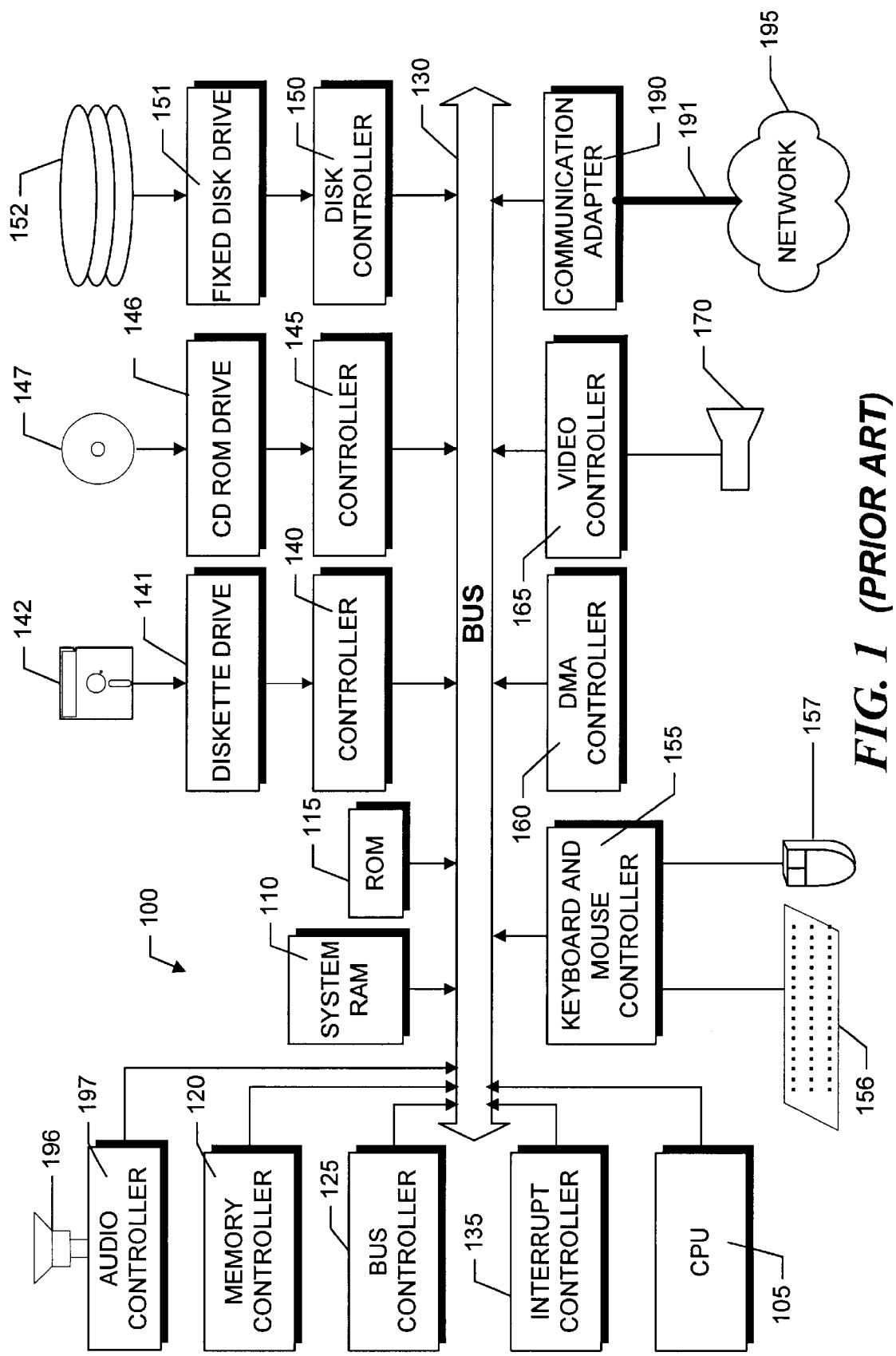
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Austin, Tex. The operating system controls allocation of system resources and performs tasks such as processing scheduling, memory management, networking, and I/O services, among other things.

The Java programming language is rapidly emerging as the preferred OOP language for Internet and cross platform use because Java programs consist of bytecodes, which are architecture and operating system independent and can be sent over the Internet and other networks. The bytecode is actually executed on a particular platform by means of a "virtual machine" (VM) which allows a Java program to be run on any platform, regardless of whether the Java program was developed on, or for, the particular platform which attempts to run the Java program. Java bytecodes which arrive at the executing machine are interpreted and executed by the embedded VM.

A complete Java program is known as an application, while a segment of Java code, which does not amount to a full application, but is reusable, is referred to as an "applet". Java also includes a component model. A component within Java is referred to as a "bean," and includes a defined interface. Java beans are used within applets and applications and a programmer need not know the internal structure of the Java bean to use it, he need only know the interface. In addition, once the interface of a bean is known, a programmer can create a new customized component from the base Java bean component. The Java bean contains properties and methods, which can be changed when another bean is derived created from the bean, which is how customization of the new component is achieved.

Because Java programs are intended to be transmitted over the Internet, the final program is packaged into what is referred to as a Java Archive (JAR) file. The JAR file is actually a "zipped", or compressed, file which includes all related files for that application, applet, or component. Also included in the JAR file is a manifest file, which includes extra information concerning the zipped portion of the file. For example, the manifest file can indicate the contents of the JAR file and whether a particular zipped file is a bean or a resource file, its file version number, and so on.

Since Java is well-suited to operation over networks, the following description of the illustrative embodiment is directed toward the Java programming language. However, it will be obvious to those skilled in the art that the invention could be implemented for other OOP languages as well, e.g. C++.

Figure 2:
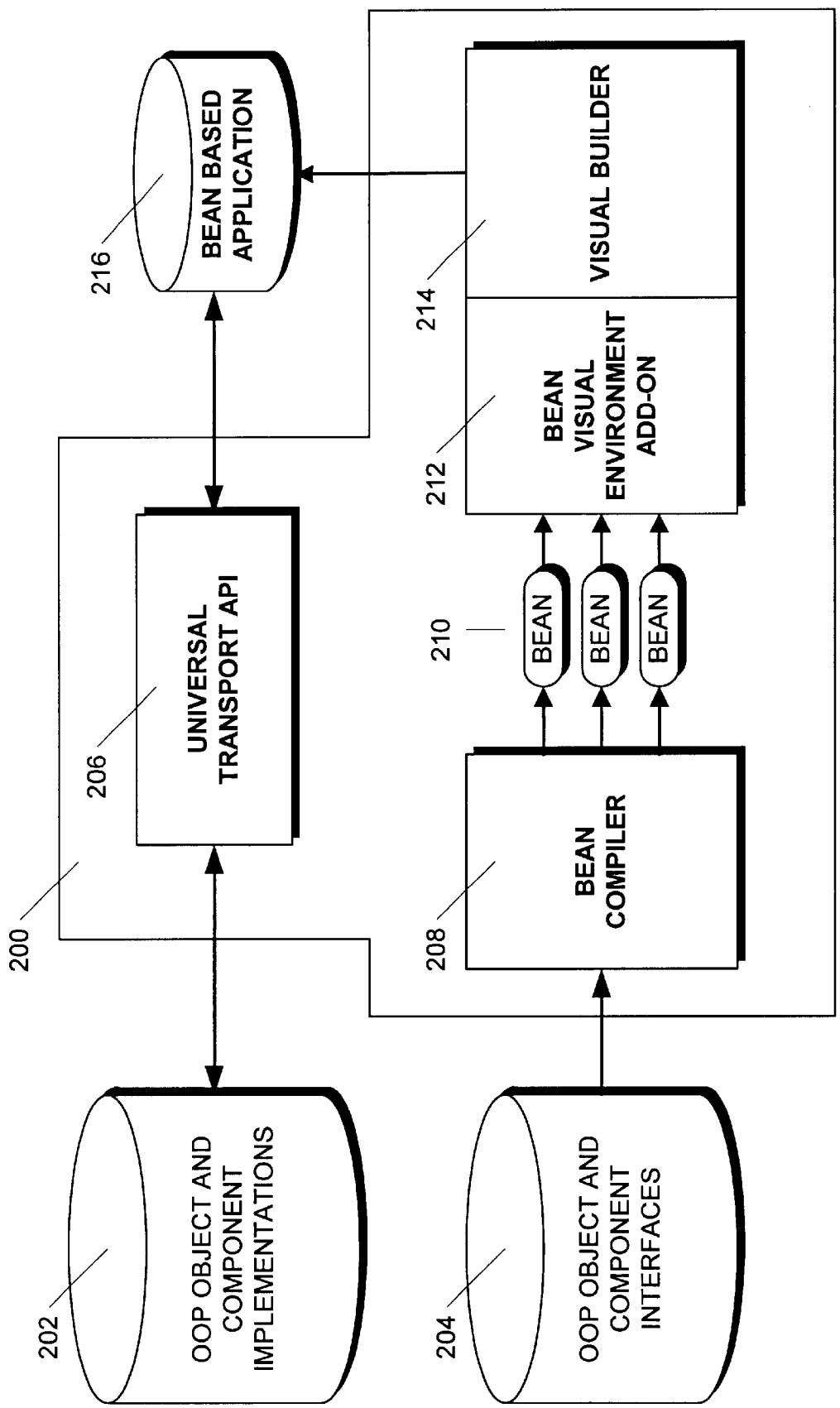
FIG. 2 is a schematic block diagram of a bean creator constructed in accordance with the principles of the present invention.

FIG. 2 shows an illustrative embodiment of a component creator apparatus 200 which is used with computer 100, or its equivalent. In accordance with Java terminology, the component creator 200 will hereinafter be referred to as "bean creator" 200. The apparatus enables a computer user or programmer to build "bean-based" applications 216 from existing OOP object and component code 202, 204 using a standard visual builder 214. The primary components of the illustrative embodiment 200 are universal transport API 206, bean compiler 208, and bean visual environment add-on 212. The bean creator 200 may be used for building applications on distributed systems or independently on a single computer.

OOP object and component interfaces 204 which define the objects and components which are to be used with the system are provided to a bean compiler 208. As previously mentioned, the bean compiler 208 converts each component into proxy components 210, where each method in the component is converted into a separate proxy component of the components 210. The proxy components 210 can be manipulated with the help of a conventional visual builder 214 which has been provided with a bean visual environment add-on that allows the proxy components to be recognized by the visual builder.

Using the visual builder, an application 216 can be created with the proxy components. This application is essentially a collection of composite components. Each composite component is an interconnected collection of proxy components.

Each composite component in the application 216 can be tested within the visual builder by means of the universal transport API 206 which allows the code which implements the underlying objects and components 202 to be exercised under control of the proxy components. If the composite component does not operate properly, it can be rebuilt within leaving the visual builder environment. The different portions of the illustrative embodiment are discussed in more detail below.

Figure 3:
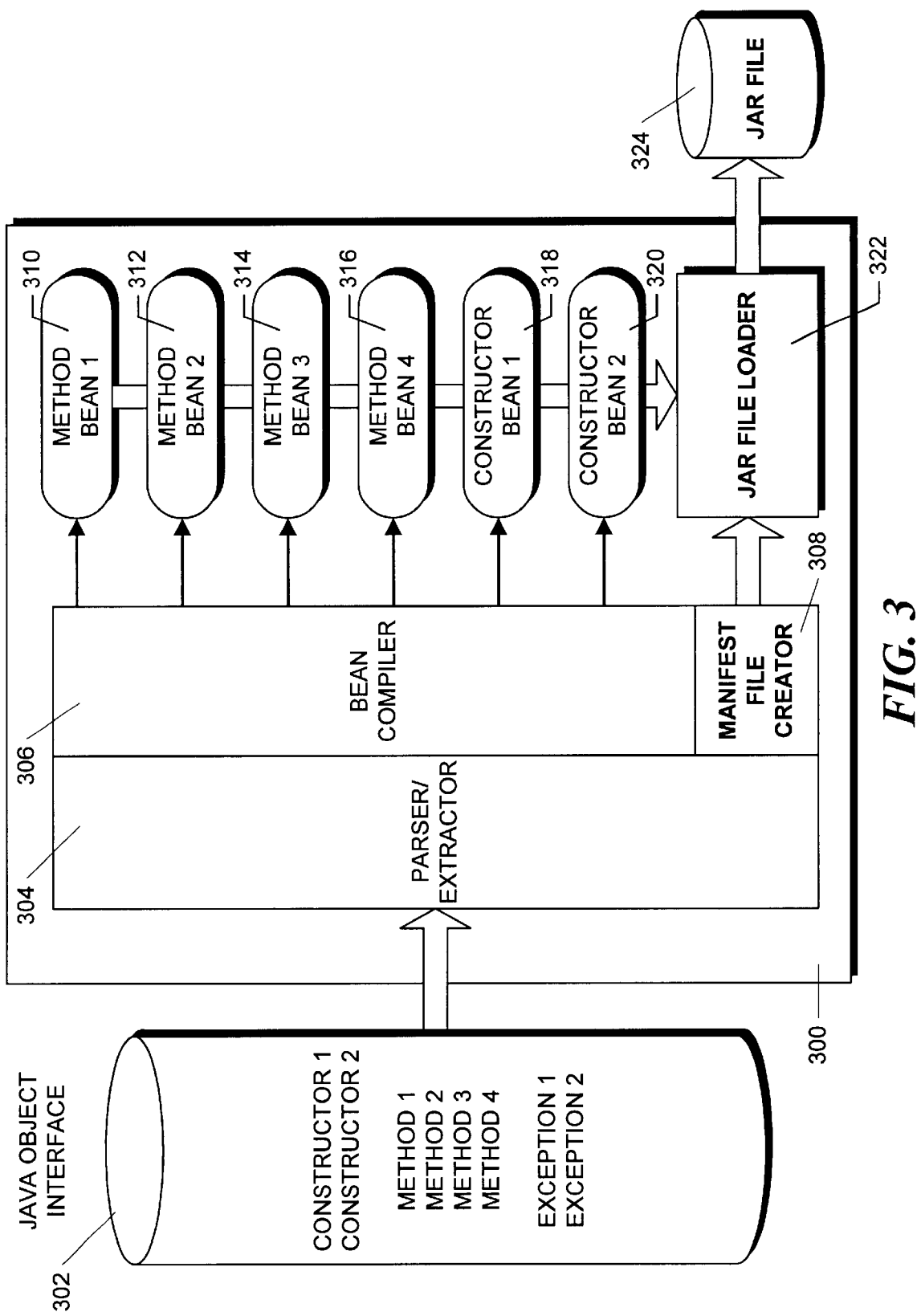
FIG. 3 is a more detailed block diagram of a bean compiler.

Referring to FIG. 3, the bean compiler 208 of the illustrative embodiment is shown in more detail. Bean compiler 300 accepts text-based Java class code from any source file 302, including Java class files and Java bean files. Bean compiler 302 parses the code and extracts the relevant methods and parameters. Illustratively, the OOP class code is the interface code for a Java class which includes two constructors (Constructor 1 and constructor 2), four methods (Method 1, Method 2, Method 3 and Method 4). Identifiers from two exceptions (Exception 1 and Exception 2) are also included. These latter identifiers can be text messages or other identification code. Code 302 may also be source code for a component such as a Java bean.

Bean compiler 300 includes a parser/extractor 304 which, in turn, includes methods that parse and extract code from each Java class. Such a parser/extractor is conventional and may, for example, be similar to a parser used in a compiler which responds to source code by parsing and extracting keywords and other identifiers. From each class, the parser/extractor 304 parses each constructor and each method and extracts any related fields, comments, and parameter names. Using the extracted constructor information, the compiler module 306 creates and compiles a constructor bean such as beans 318 and 320. The compiler 306 also creates a method bean from extracted information for each method in the class, for example method beans 310–316.

As the beans are created they are inserted into a JAR file 324 by JAR File loader 322. Once all of the beans have been created, another module, the manifest file creator 308, of bean compiler 306 produces a complete manifest file, with an ".mf" suffix. Manifest files are customary in the Java programming language and well known, so will not be discussed in detail herein.

The compiler module extracts more detailed information than previously extracted by various conventional processing. For example, assume the following method existed in the interface class 302:

```
public Address getAddress (
    String firstName,
    String lastName);
```

Unlike the conventional extraction process of "reflection", which would only determine that the method takes as parameters two string objects, the bean compiler 300 extracts the actual parameter names "firstName" and "lastName". Extracting these parameter names allows these parameters to be converted to properties of the method bean created from the original method "getAddress". Maintaining these parameters as properties allows more flexibility in the construction and customizing of new beans created from the getaddress method bean.

As previously mentioned, component creator 200 functions to convert Java class code and other Java beans into proxy beans which can be combined to form a "bean-based" application by a conventional visual builder. In particular, Java class or Java bean interface code 204 is provided to bean compiler 208. Code 204 is either local or, in the case of a distributed object system, is generally exported by the remote server. As previously mentioned, bean compiler 208 generates a constructor bean for each constructor in the code and a method bean for each method. These proxy beans 210 lo are provided to a visual builder 214. In accordance with the principles of the invention, visual builder 214 includes a bean visual environment add-on 212, which allows the proxy beans 210 to appear directly on the builder's object palette. The proxy beans can therefore be manipulated in a conventional fashion using builder 214. Since the proxy beans include the parameters of the methods as attributes, the method parameters can be manipulated directly by changing the attributes of the proxy beans in order to generate a bean-based application 216.

The bean-based application 216 can be tested within the visual environment by using the universal transport API 206 to access the Java objects instantiated from a selected class called the "target" class in the class and bean implementations 202. In particular, universal transport API 206 operates under control of constructor and method objects instantiated by the proxy beans 210 within bean-based application 216 to call the appropriate constructors and methods for the target class in the implementation code 202 as will be hereinafter explained in detail. The bean compiler 208, the bean visual environment add-on 212 and the universal transport API 206, function together to allow Java objects and beans to be manipulated by means of a standard visual builder 214 regardless of whether the objects were originally designed to be used as beans.

Figure 4:
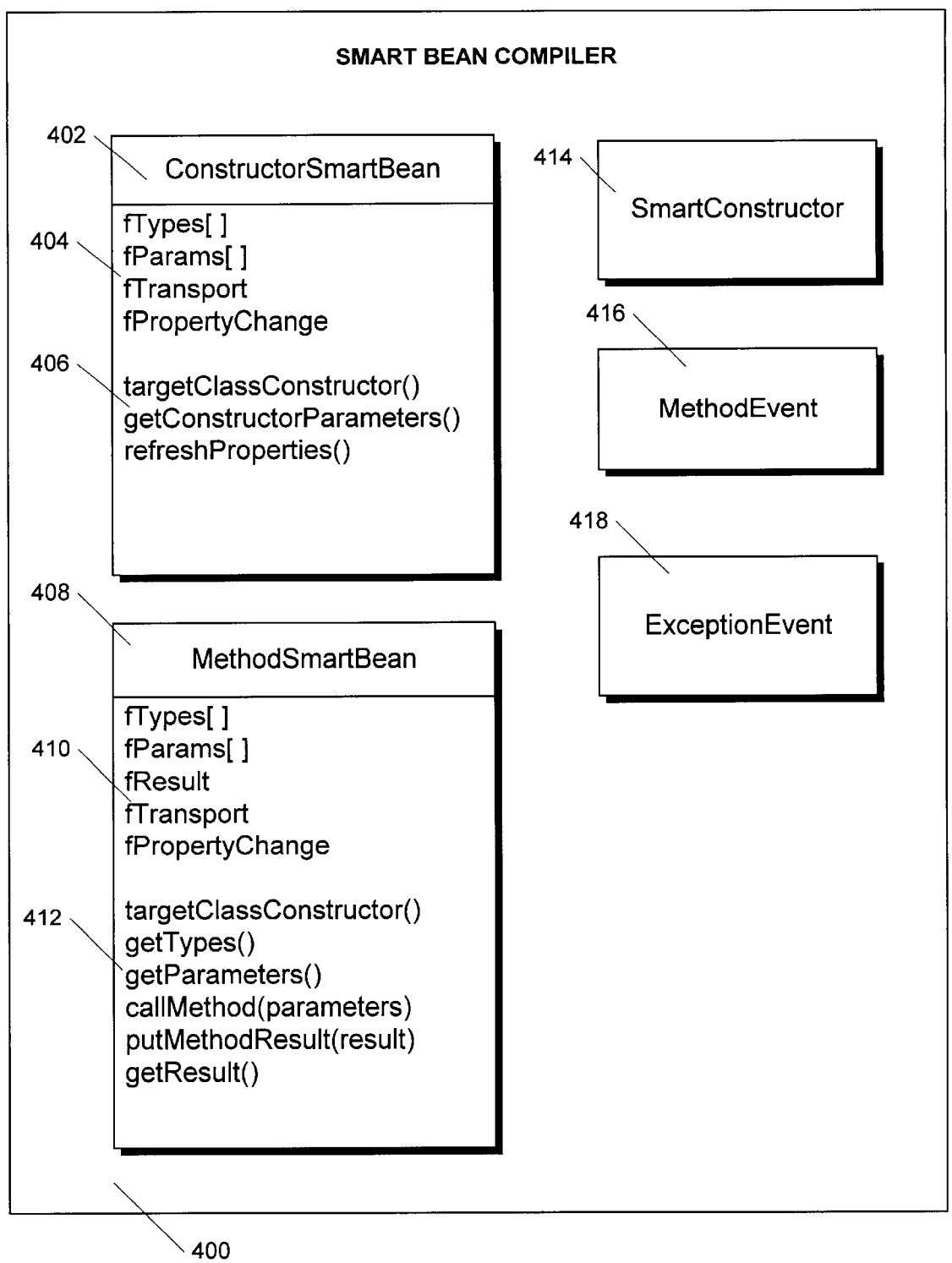
FIG. 4 is a schematic block diagram of classes used by the bean compiler of FIG. 3.

The bean compiler 208 generates code for the constructor beans and method beans by subclassing and modifying two main classes, which are illustrated in FIG. 4. These classes include the ConstructorSmartBean class 402 and the MethodSmartBean class 406, each of which has a set of properties and methods. For example, the ConstructorSmartBean class 402 has properties 404, which include the properties fTypes and fParams, which, as will hereinafter be described in more detail, are used to specify the type of constructor which will be used to instantiate an object from the target class. The ConstructorSmartBean properties also include the fTransport reference and the fPropertyChange reference, which are used to reference a transport object which will be used to forward the constructor and method calls to the target class and to reference a notification object that is part of a conventional notification system.

The ConstructorSmartBean class 402 also includes the plurality of methods including the targetClassConstructor( ) method, which is used to invoke the constructor of the target class, the getConstructorParameter( ) method, which is used to obtain parameters required by the targetClass Constructor( ) method and the refreshproperties( ) method, which is used to broadcast data change notifications.

Similarly, the MethodSmartBean class 408 includes properties 410, including the properties fTypes, fParams, fTransport, and fPropertyChange which are analogous to the similarly-named properties in the ConstructorSmartBean class 402. In addition, the MethodSmartBean class 408 includes an additional property, fResult, which is used to hold a result returned by the associated method call.

The result property can be manipulated by the putMethodResult( ), and getResult( ) methods, which are used to invoke force the result to a specified value and read the result. The MethodSmartBean class 408 also includes the targetClassConstructor( ), getTypes( ) and getParameters( ) methods, which are used in invoking a constructor in the target class and an additional method, callMethod( ), which is used to invoke the associated method.

Three additional classes, the SmartConstructor class 414, the MethodEvent class 416, and the ExceptionEvent class 418 are instantiated by the constructor and method beans to encapsulate various parameters and data which are associated with the constructor and methods of the target class and exceptions generated by the constructor and methods. Objects instantiated from these latter classes are then forwarded, via the transport mechanism discussed previously, to the target class. In particular, the SmartConstructor class 414 encapsulates the parameters used in the constructor which instantiates the target class. Similarly, parameters associated with a method are encapsulated in the MethodEvent class 416 for transmission to the target object. Finally, exceptions generated by the target object are encapsulated in the ExceptionEvent class 418 for transmission back to the constructor or method bean, which initiated the constructor or method call.

Figure 5:
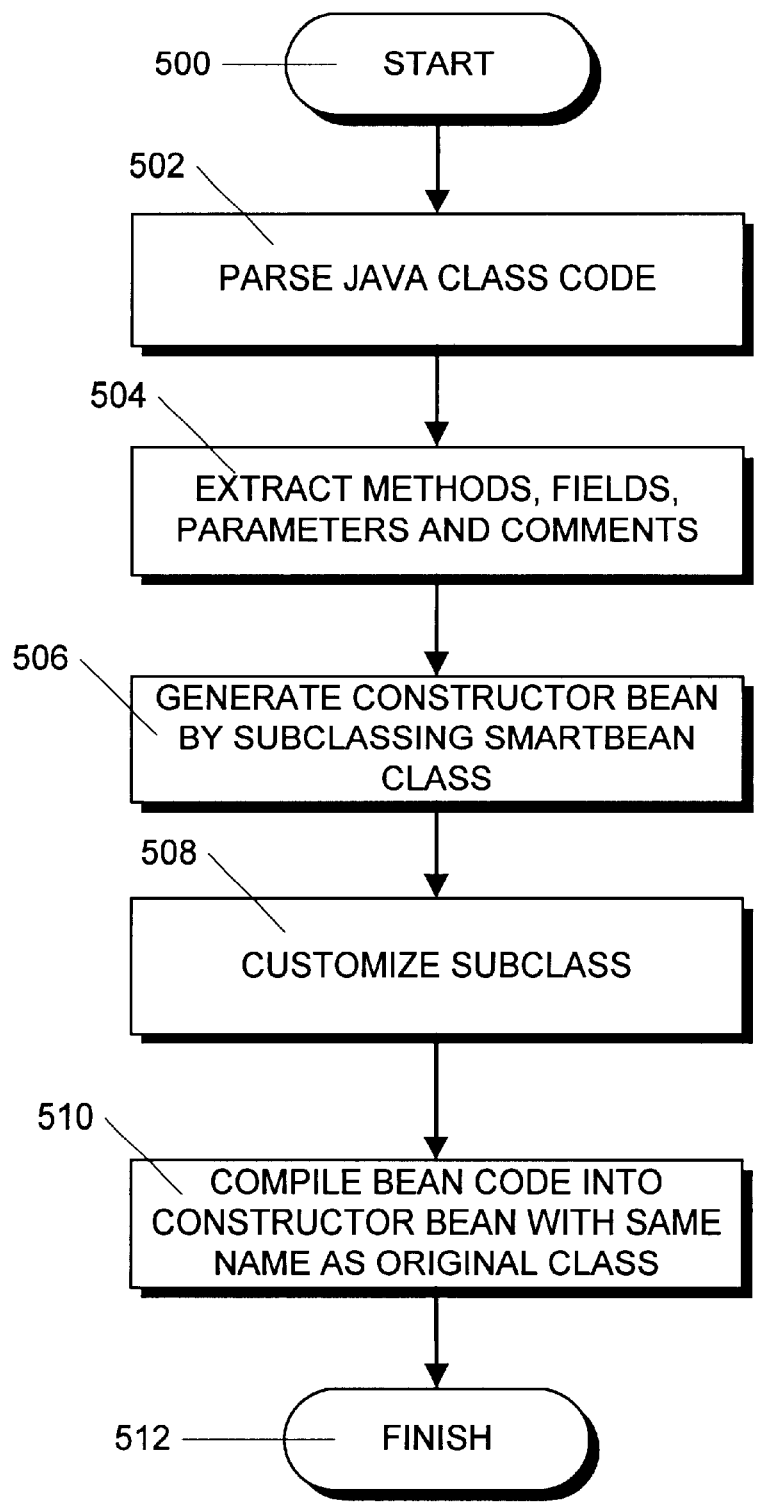
FIG. 5 is a flowchart depicting the steps in an illustrative routine for generating a constructor bean.

A routine for generating and compiling code for a constructor bean is illustrated in FIG. 5. The routine starts in step 500 and proceeds to step 502 where the Java class code is parsed. In step 504, the parsed code is examined to extract methods, fields, parameters, and comments.

Next, in step 506, the code for the constructor bean is generated by subclassing the ConstructorSmartBean class 402, and, in step 508, customizing the resulting subclass. During this process the parameters of the original constructor become the bound properties of the constructor bean with the suffix "_CP" added. In this context a "bound" property is a property which generates a data change notifiaction when its value is changed.

In step 510, the bean code is compiled into the constructor bean which is given a name derived from the original Java class. The routine then finishes in step 512.

Figure 6:
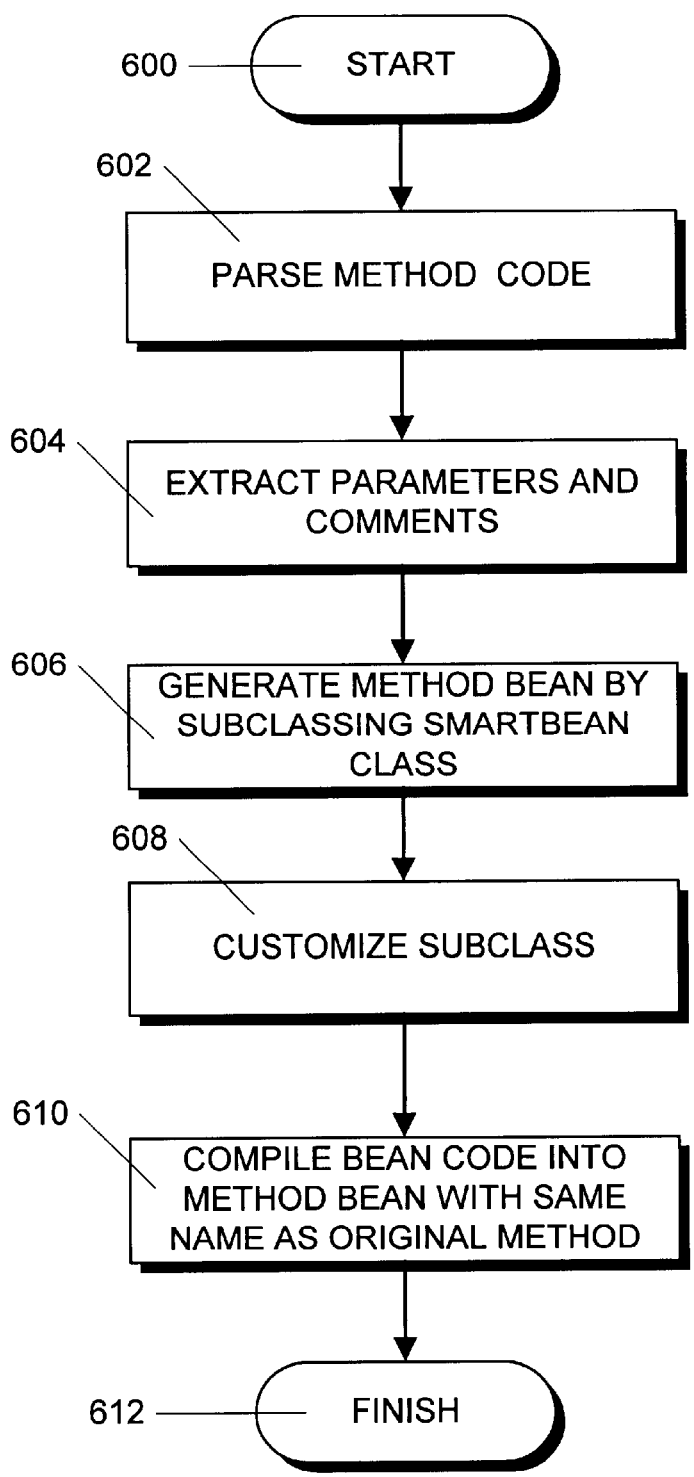
FIG. 6 is a flowchart depicting the steps in an illustrative routine for generating a method bean.

A similar routine is used to create and compile code for the method beans. Such a routine is shown in FIG. 6, which starts in step 600 and proceeds to step 602, in which the method code is parsed. In step 604, the parameters and comments associated with the method are extracted.

Next, in step 606, the method bean code is generated by subclassing the MethodSmartBean class 408 and customizing the subclass as indicated in step 608. During this process the parameters of the original method become the bound properties of the method bean. In addition, the special bound property called "result" is created to receive the result, if any, of the method call. Next, in step 610, the bean code is compiled into the method bean with a name derived from the original method name. The routine then finishes in step 612.

Figure 7:
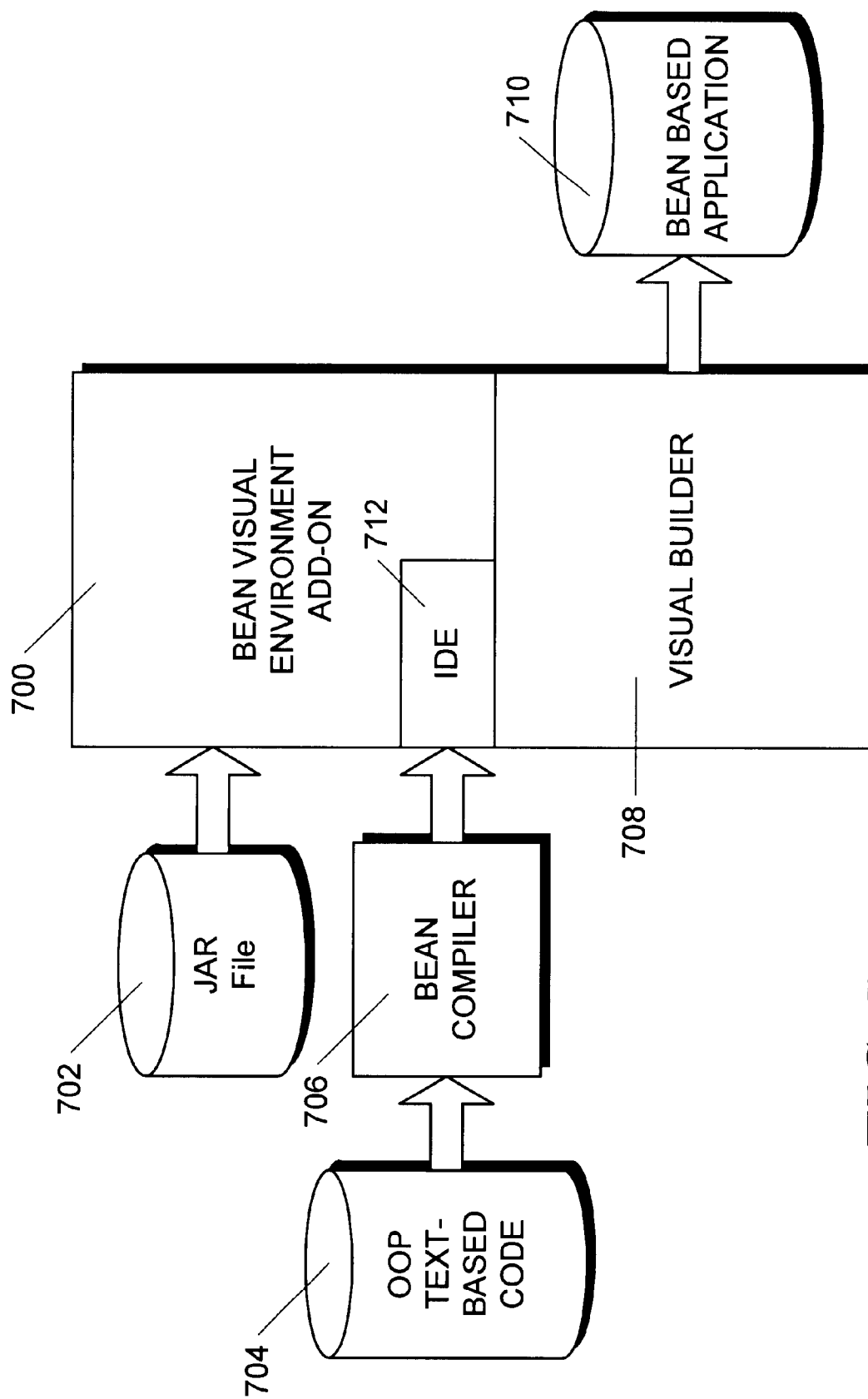
FIG. 7 is a more detailed schematic block diagram of a bean visual environment add-on illustrating the relationship with a visual builder.

The beans produced by the bean compiler can be used with a conventional visual builder by means of an add-on application. Referring to FIG. 7 of the illustrative embodiment, a visual environment add-on (VEA) program 700 extends the capability of a standard Java "bean-compliant" visual builder 708 to give the user of the visual builder 708 access to methods and constructors, as beans, within any OOP code. The Java bean-compliant visual builder 708 can be any conventional visual builder, such as the Visual Age WebRunner™ marketed by International Business Machines Corporation, Armonk, N.Y.

VEA 700 allows access by the visual builder 708 to beans contained in JAR file 702, which beans may be the beans created by the bean creator as discussed above. VEA 700 makes the method and constructor beans available to be read into the "palette" of the visual builder 708. A user can then copy beans from the palette into the visual builder "workspace" to customize and combine the beans as needed in order to create a new OOP application 710 in a conventional manner. Non-bean text-based OOP code can also be read in using the VEA's Interactive Development Environment (IDE) 712, which, in turn, uses the aforementioned bean compiler to produce beans that are usable by the visual builder 708.

Figure 8:
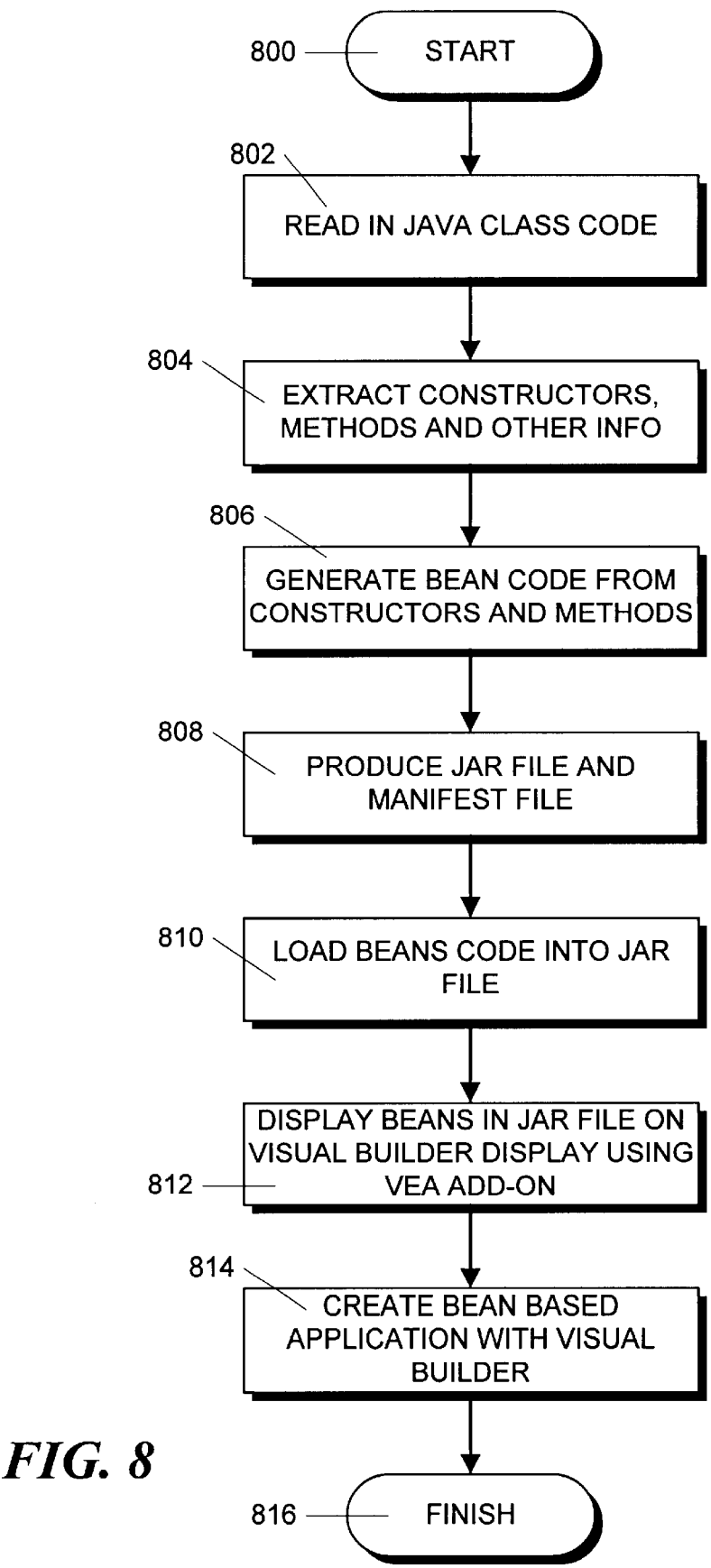
FIG. 8 is a flowchart depicting the steps in an illustrative routine for generating a bean-based application using the inventive apparatus and method.

Referring to FIG. 8, the entire process of creating bean-based applications from original text-based OOP code is illustrated. The process starts in step 800 and proceeds to step 802 where object-oriented design code is read in to the bean creator 200.

In step 804, the class code is parsed and the constructors, methods and other information discussed above is extracted. The extracted information is used to generate bean code which is then compiled, in step 806, to produce method and constructor beans. In step 808, the bean creator 200 produces the JAR and manifest files which contain the newly-produced beans. The beans are loaded into the JAR file in step 810.

In step 812, the new beans are placed on the palette of a visual builder using the visual environment add-on. In step 814, the bean visual environment add-on is used, in conjunction with a visual builder 1320, to create a bean-based application. At step 816, the process is complete.

Figure 9:
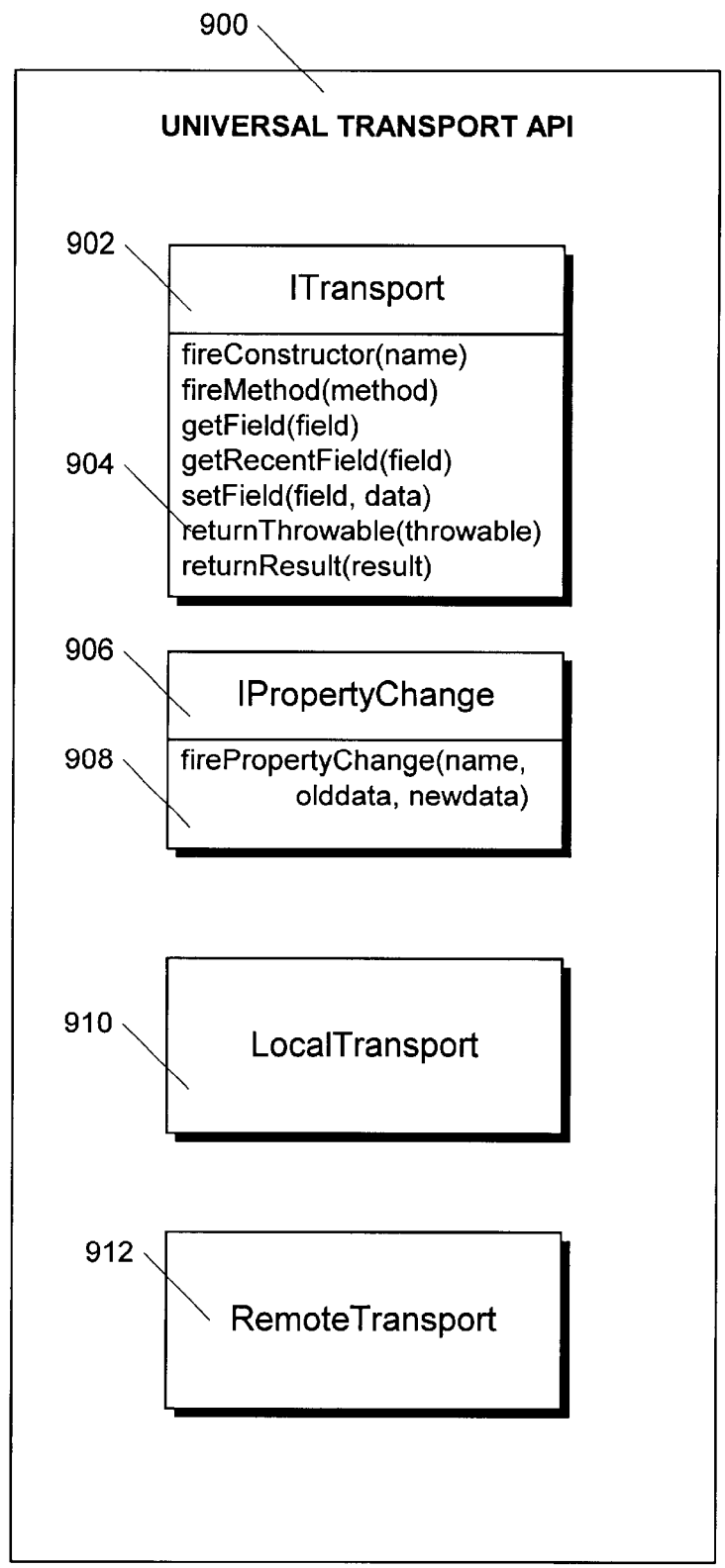
FIG. 9 is a schematic block diagram of interface and implementation classes composing a universal transport API of the illustrative embodiment.

Once a bean-based application is created, it interacts with the code implementing the underlying Java class by means of a universal transport API. This process is illustrated in FIG. 2 where bean-based application 216 uses universal transport API 206 to operate with class implementations 202. FIG. 9 illustrates the contents of the universal transport API 206, which include several Java interfaces 902 and 906 and implementation classes 910 and 912. The universal transport API 900 provides a framework for manipulating Java objects in a "bean-oriented" manner according to the ITransport interface 902. Interface 902 contains methods 904 which allow either local or remote objects to be constructed using both null and complex constructors (fireConstructor), methods to be called (fireMethod), and field values to be set and retrieved (setField and getField, respectively.) A null constructor is one which has no parameters whereas a complex constructor is passed parameters or arguments to construct objects.

The interface 902 has two implementations: LocalTransport 910 and RemoteTransport 912. The LocalTransport implementation 910 translates application-specific messages into method calls on local Java objects (not shown.) The RemoteTransport implementation 912 is utilized in conjunction with a distributed object architecture to translate application-specific messages into method calls on remote Java objects (not shown.) If distributed object framework is used, remote objects, such as RMI objects, CORBA objects or Java objects which are not RMI or CORBA compliant can be accessed by selecting an appropriate adapter (not shown) for the object model.

The universal transport API 900 also includes an IPropertyChange interface 906 which contains, among other things, a method 908 that transmits data change notifications to registered listeners in accordance with a conventional notification arrangement.

In order to use the universal transport API 900, a transport object is first instantiated from the LocalTransport or the RemoteTransport class according to the location of the target class implementations. Then, a constructor bean method or method bean method which invokes a target method in the target class encapsulates the target method parameters in an object instantiated from the MethodEvent class 416 (FIG. 4) in order to permit late binding. The MethodEvent object can be serialized and transmitted over a network by the fireMethod method in the transport object to the class implementations. Exceptions, and other throwables, are encapsulated in an object created from ExceptionEvent class 418 whicah also allows for serialization. The ExceptionEvent class 418 allows exceptions which would normally be lost to be transmitted back to the client application. For example, a remote RMI-compliant object which stores employee information for a business will throw an exception when a look up error such as "Employee not found in records" occurs. In accordance with normal RMI operation, this exception will be hidden from the client by a java.RMI.RemoteException object and appear to the client as a network failure, rather than the lack of the searched instance. However, with the inventive bean creator using the API transport 206, encapsulation and serialization of the exception allows the original exception, "Employee not found in records," to propagate from the server back to the client.

Constructor parameters are encapsulated in a SmartConstructor class 414, which also permits late binding and serialization. Methods which set and get field values in the target object are also serialized, but they are not encapsulated within separate classes because this encapsulation is handled by the SmartConstructor class 414. Therefore, the RemoteTransport implementation 912 allows direct access to remote native methods in a Java class without requiring a server-side wrapper class to be used. Generation of such a server-side wrapper class would require manual coding and could perturb the original code design, both of which are undesirable.

Figure 10:
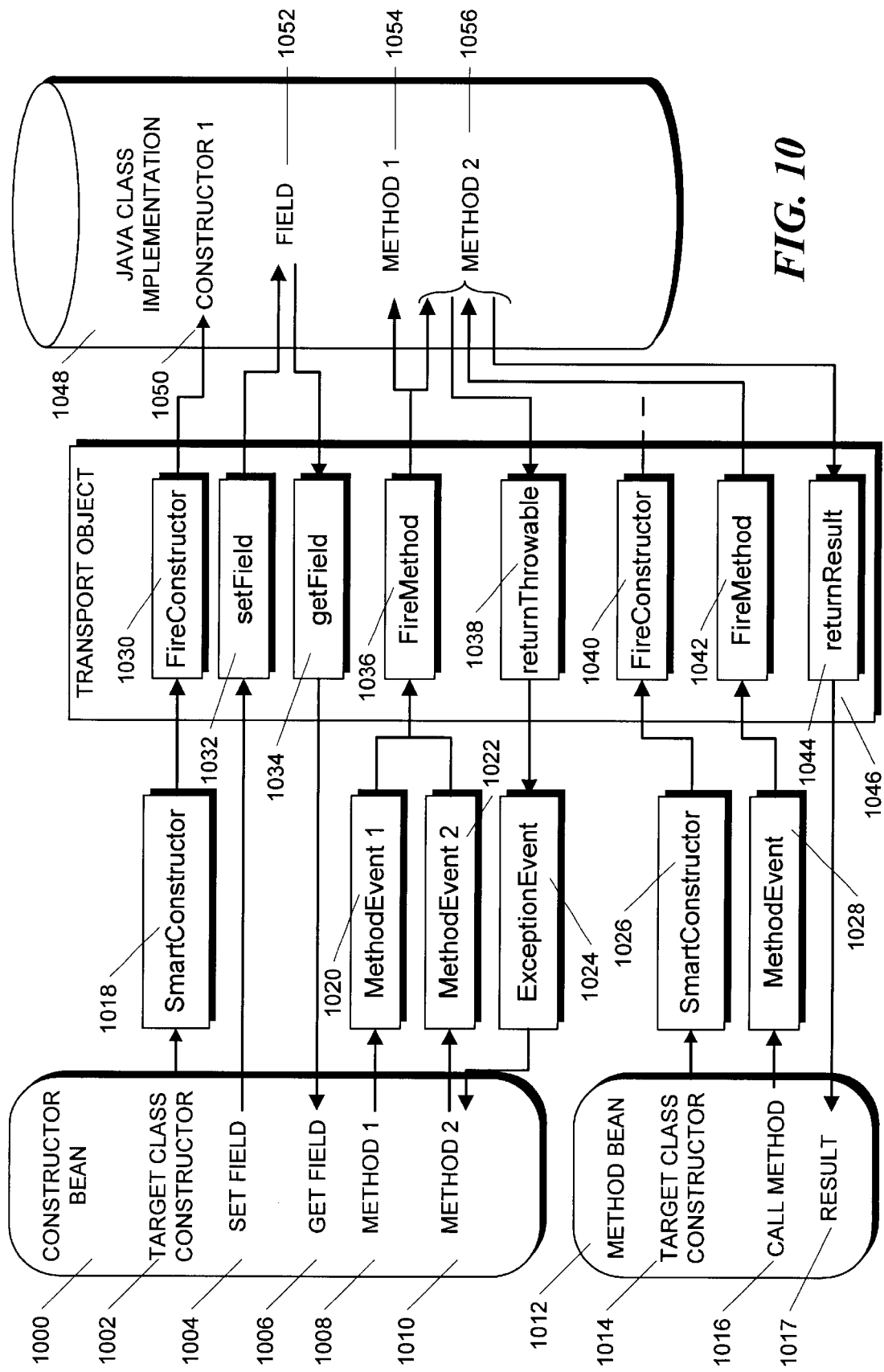
FIG. 10 is a schematic block diagram illustrating the control of class implementations by a constructor and method bean using the universal transport API.

FIG. 10 illustrates, in a schematic fashion, the operation of the constructor and method beans in conjunction with a transport object to manipulate the code for the target object. A single constructor bean and a single method bean are shown, but additional beans can be generated which operate in the same manner as those shown. Constructor bean 1000 includes a targetClassConstructor( ) method 1002 which is designed to invoke either a null, or a complex, constructor in the target class. The setField( ) and getField( ) methods 1004, 1006, respectively, are used to manipulate values in fields and properties of the target object. In addition, constructor bean 1000 includes two methods designated as Method 1 1008 and Method 2 1010. These methods interact with methods in the transport object 1046 to invoke methods in the Java class implementation 1048. For example, when the targetClassConstructor( ) method 1002 is invoked in constructor bean 1000, it instantiates a SmartConstructor object 1018 passing in any parameters which are required for invocation of the constructor in the target class. The SmartConstructor object 1018 is, in turn, passed to the fireConstructor( ) method 1030 in the transport object 1046. The fireConstructor( ) method 1030, in turn, invokes the constructor 1050 with the appropriate parameters in the target class implementation 1048 to construct the target object.

Fields in the target object, such as field 1052 can be manipulated by means of the setField( ) method 1004 in constructor bean 1000. The setField method, in turn, invokes the setField method 1032 in the transport object 1046 in order to insert a value into field 1052 of the target object. Similarly, the value in field 1052 can be retrieved by means of the getField( ) method 1034 in transport object 1046 and returned to the getField( ) method 1006 in constructor bean 1000.

If Method 1 (1008) is invoked in constructor bean 1000, it instantiates a MethodEvent object 1020 which encapsulates parameters and data associated with the method. The MethodEvent object 1020 is then passed to the fireMethod( ) method 1036 in transport object 1046. The fireMethod( ) method invokes Method 1 (1054) in the target object passing in the encapsulated parameters as necessary. An invocation of Method 2 (1010) instantiates a second MethodEvent object 1022 which is then passed to the fireMethod( ) method 1036 to invoke Method 2 (1056) in the manner previously described.

If either of the methods 1054 or 1056 generates an exception or other throwable, the throwable is returned via the returnThrowable( ) method 1038 in transport object 1046 which, in turn, creates an ExceptionEvent object 1024 encapsulating the exception parameters including any exception text. The ExceptionEvent object is then returned to the constructor bean 1000.

The method bean 1012 operates in a similar manner. It also contains a targetClassConstructor( ) method 1014 which, in turn, instantiates a SmartConstructor object 1026 that can be applied to the fireConstructor( ) method 1040 in transport object 1046. Method 1040 may be the same as method 1030, but is shown separately for clarity. This operation constructs the target object if it is not already constructed Similarly, an invocation of the callMethod( ) method 1016 in method bean 1012 causes a MethodEvent object 1028 to be instantiated, which MethodEvent object encapsulates the parameters of the method. The MethodEvent object 1028 is, in turn, passed to a fireMethod( ) method 1042 (which may be the same as method 1036) in the transport object 1046 which, in turn, invokes the proper method in the target object.

The result generated by an invoked method is returned by the returnResult( ) method 1044 in transport object 1046 which transports the result to the Result property 1017 in method bean 1012.

The following is an example of the operation of the bean compiler. In this example the target class is a Java class called AccountInfo. The class contains the account owner's first and last names and retrieves information about an account owner, including the owner's date of birth (DOB), account balance and type, etc. The COM.test.AccountInfo class has a class definition as follows:

```
package COM.test;
public class AccountInfo
{
    public String firstName, lastName;
    public AccountInfo(String SSN)
        throws Exception
    public String getDOB
    {...}
    public String getAccountType()
    {...}
    public Float getBalance()
    {...}
    public void setBalance (Float bal)
    {...}
    public String createReport (boolean history)
    {...}
}
```

Using the inventive bean compiler, two classes would be generated based upon this class definition. The first generated class is a constructor bean for the class constructor:
   public Accountinfo (String SSN).
The skeleton of the constructor bean class would be as illustrated in the Java code snippet which follows:

```
package COM.test;
public class AccountInfoSBC1
    extends ConstructorSmartBean
    implements java.io.Serializable
{
    // Constructor Type array
    private Class fTypes [] = {String.class};
    // Constructor Parameters
    private Object fParams [] = new Object [1];
    ...
}
```

Note that this constructor bean class inherits from the constructor bean base class, ConstructorSmartBean, and is serializable. The "SBC1" postfix indicates that this is constructor number 1 for a constructor bean.

The class also contains two private fields. The first field fTypes is used to locate the correct constructor for the target object. The second field, fParams, is used to hold and pass the constructor parameters, which appear in this constructor bean as properties.

Next, the constructor for the AccountInforSBC1 constructor bean class is created as illustrated in the Java code snippet below:

```
public AccountInfoSBC1() throws Exception
{
    super();
    try
    {
        setConstructor
            (new SmartConstructor("COM.test.AccountInfo",fTypes));
    }
    catch (Exception e)
    {
        ...
    }
}
```

This constructor instantiates a SmartConstructor object for the eventual target class COM.test.AccountInfo.

Next, code to handle the retrieval of the constructor parameters, as well as property change notifications for the target object's original fields is generated as shown in the following Java code snippet:

```
public Object [ ] getConstructorParameters()
{return fParams;}
public void refreshProperties()
{
    fPropertyChange.firePropertyChange
        ("lastName", null, getLastName());
    fPropertyChange.firePropertyChange
        ("firstName", null, getFirstName());
    fPropertyChange.firePropertyChange
        ("DOB", null, getDOB());
    fPropertyChange.firePropertyChange
        ("accountType", null, getAccount Type());
    fPropertyChange.firePropertyChange
        ("balance", null, getBalance());
}
```

Note the reference fPropertyChange to a data notification object which transmits the data change to all interested "listener" parties.

Next, code to handle the getting and setting of properties originally specified as public fields on the target object is created. The following code snippet illustrates the code which manipulates the target object lastName field. The code for other fields is analogous. This code uses a reference fTransport to a transport object which conveys the object invocations to the target object:

```
public String getLastName()
{
    try
    {
        return (String) fTransport.getField("lastName");
    }
    catch  (Throwable t)
        {return null;}
}
public void setLastName(String data)
{
    try
    {
        Object old = fTransport.getRecentField ("lastName");
        fTransport.setField("lastName", data);
        fPropertyChange.firePropertyChange("lastName, old, data);
    }
    catch  (Throwable t)
        {return;}
}
```

Note that a property change notification is sent when the value of the lastName field changes indicating that this is a bound field. Since certain methods of the target class are treated as constructor bean properties because of the set/get design patterns they express, they are handled as illustrated in the following code snippet. Only the getBalance( ) and setBalance methods are illustrated, other methods are treated in a similar manner:

```
public Float getBalance ()
{
    try
    {
      Class types[ ] = {}
      Object params[ ] =- {}
      MethodEvent method = new MethodEvent
        (this, "getBalance", types, params, true);
      return (Float) fTransport.fireMethod(method);
    }
    catch  (Throwable t)
        {return null;}
}
```

-continued

```
public void SetBalance (Float data)
{
    try
    {
      Object old = fTransport.getRecentField("balance");
      Class types [ ] = {Float.class};
      Object params [ ] = {bal};
      MethodEvent method = new MethodEvent
        (this, "setBalance", types, params, true);
      fTransport.fireMethod(method);
      fPropertyChange.firePropertyChange("balance", old, bal);
      return;
    }
    catch  (Throwable t)
        {return;}
}
```

The inventive bean compiler also generates a bean for each method in the target class. The bean has the same name as the method with a postfix "SBM." The "SBM" postfix indicates this is a method bean. A partial class definition for the createReport method in the sample target class is illustrated by the following Java code snippet:

```
public class CreateReportSBM
    extends MethodSmartBean
{
    private String fResult=null;
    private Class fTypes[]={Boolean.class};
    private Object fParams[] = new Object [1];
}
```

As with the aforementioned constructor bean, this class also contains two private fields. The first field fTypes is used to locate the correct constructor for the target object. The second field, fParams, is used to hold and pass the constructor parameters, which appear in this bean as properties. This method bean class also has a third private, field, namely the fResult field used to hold the result from the method call. The constructor for this method Bean is generated as follows:

```
public CreateReportSBM()
    super ("createReport");
    fParams[0] = Boolean.FALSE;
}
```

This constructor passes the name of the target object method to its parent's constructor. It also initializes the parameters array. Note that since the parameter for the method is a primitive type, the compiler must be intelligent enough to convert to the corresponding Object type, as well as to supply a default value.

The illustrative method bean also contains the next code section which is similar for any method bean:

```
public void putMethodResult (Object result)
{
    fResult = (String) result;
    fPropertyChange.firePropertyChange("result", null, fResult);
}
public String getResult()
{
    return fResult;
}
```

The first method, putMethodResult, allows the parent class to set the result value returned from a method call, and also allows the method bean to generate a data change notification when the result value is changed. The second method merely allows the result to be treated as a readable property. Note that for each method bean, the result type may be different.

The following two additional methods in the method bean code allow the parent class to retrieve the method types and method parameters:

```
public Class [] getTypes()
{
    return fTypes;
}
public Object [] getParameters()
{
    return fParams;
}
```

The following additional methods handle the parameters of the target method itself, while treating these parameters as bound properties of the method bean.

```
public boolean getHistory ()
{
    return
        ((Boolean)fParams[0]).booleanValue();
}
public void setHistory(boolean data)
{
    Object old = fParams [0];
    fParams [0] = new Boolean (data):
    fPropertyChange.firePropertyChange("History", old, fParams[0]);
}
```

Note again the primitive to corresponding-data-type translation. This is needed for fields of types int, short, long, boolean, byte, char, float, and double.

Figure 11:
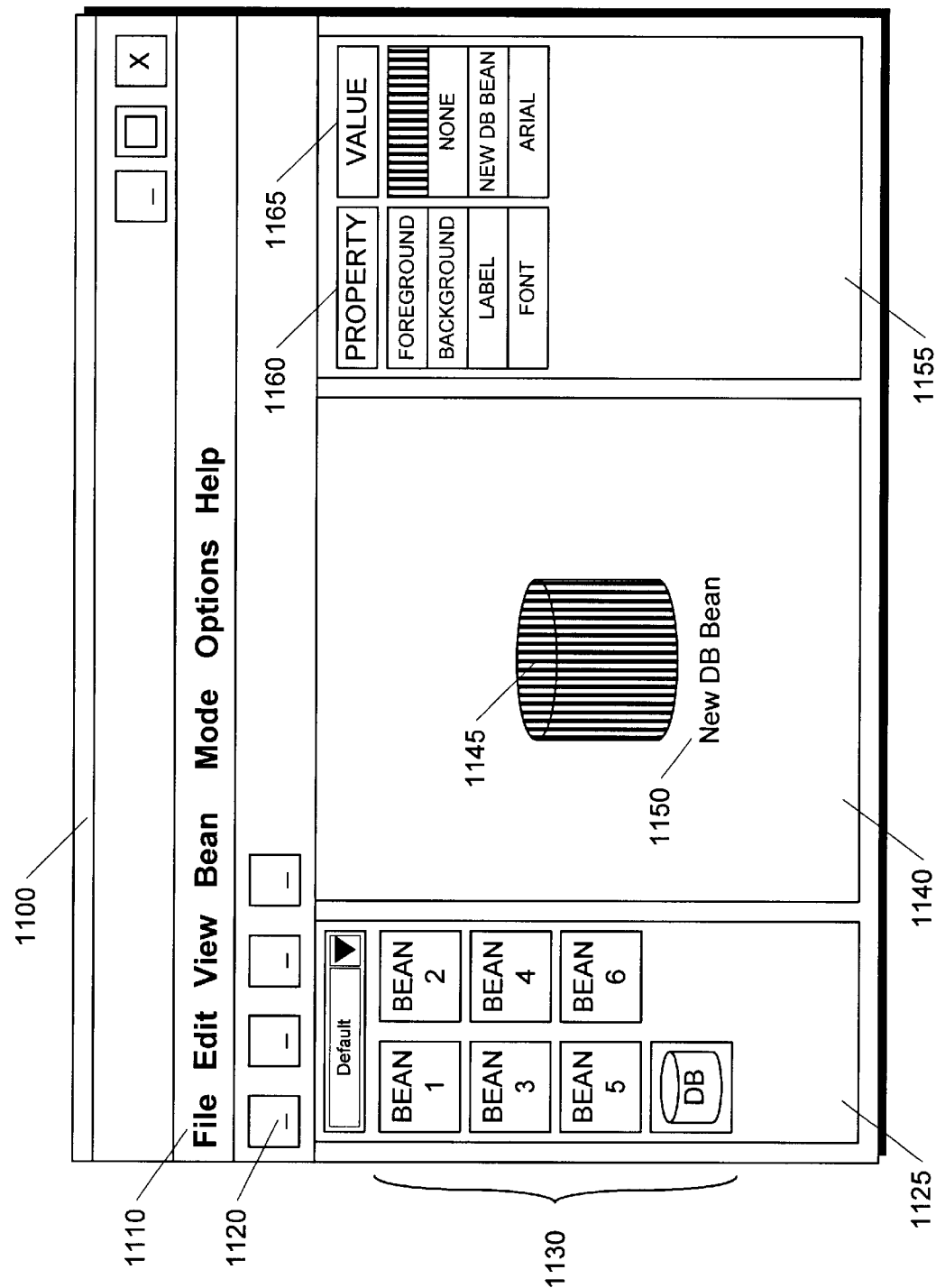
FIG. 11 is a schematic illustration of a screen display generated by a conventional visual builder incorporating the present invention.

As previously mentioned, once the proxy beans are constructed, they can be displayed, manipulated and tested by means of a bean tester that is based on conventional visual builder. The screen display of an illustrative bean tester which is based on a conventional bean-enabled visual builder is illustrated in FIG. 11. As an illustrative example, the aforementioned visual builder is the WebRunner® visual builder developed and sold by the International Business Machines corporation. It will be apparent to those skilled in the art that other bean-enabled visual builders with similar screen displays could also be used without departing from the spirit and scope of the invention. The screen display 1100 of such a builder includes a menu bar 1110 which provides a user with access to operations and properties associated with the bean in the workspace 1140. For example, the File menu would allow a user to open or close a bean file or exit the visual builder application. The Edit menu would allow a user to change properties of a bean, for example, the bean font or color scheme. A toolbar 1120 is also part of the GUI and provides a shortcut method for a user to access some of the same functionality that is available through use of the menus. The toolbar 1120 is typically comprised of toolbar buttons which represent functions, for example, opening a file and changing font attributes.

When the visual builder 1100 is launched, a bean palette window 1125 is opened which displays the beans 1130 available for manipulation. A palette title bar 1135 displays for the user which palette is open for use. For example, in FIG. 11, the title bar 1135 indicates that the "Default" palette is in use. A user may also build custom palettes tailored for particular purposes and use one of those rather than the default, if desired. In order to appear in the palette window 1125, each bean must interface with the visual builder by using the builders internal interface. The visual environment add-on 700 (FIG. 7) allows proxy beans which are generated as discussed above to appear on a custom palette in the palette window 1125 by interfacing the beans with the builders interface.

A workspace panel window 1140 is opened, generally in the center portion of the visual builder, and allows beans and objects to be visually selected and manipulated. A third panel or window is also opened in the illustrative embodiment, called the properties window 1155. The properties window 1155 displays to the user properties 1160 and the corresponding property value 1165 associated with a bean selected in the workspace window 1140. For example, a database (DB) bean is shown in the workspace 1140. The property list 1160 shows that there is a "label" property associated with the bean and the value list 1165 shows the text of the label to be "NEW DB BEAN", which is also reflected in the workspace 1150. In the case of proxy beans, the property list 1160 would display the proxy bean properties including those properties which represent the parameters of the underlying methods.

A component can be customized to create a new component using the visual builder. To accomplish this, an existing component icon is dragged from the palette 1125 into the workspace 1140. Once dragged into the palette, the component, which is the original source of what will become the customized component or part of a composite component, is selected so that its properties are reflected in the properties panel 1155. To customize the component, property values 1165 are then edited using either or a combination of the menus 1110 and toolbar buttons 1120. In the illustrative embodiment, the File menu contains a "Save As Bean" menu item option which allows the modified code to be saved as a new component. This save operation changes the original source component, represented as an icon in the palette 1125, to reflect the customization.

Figure 12:
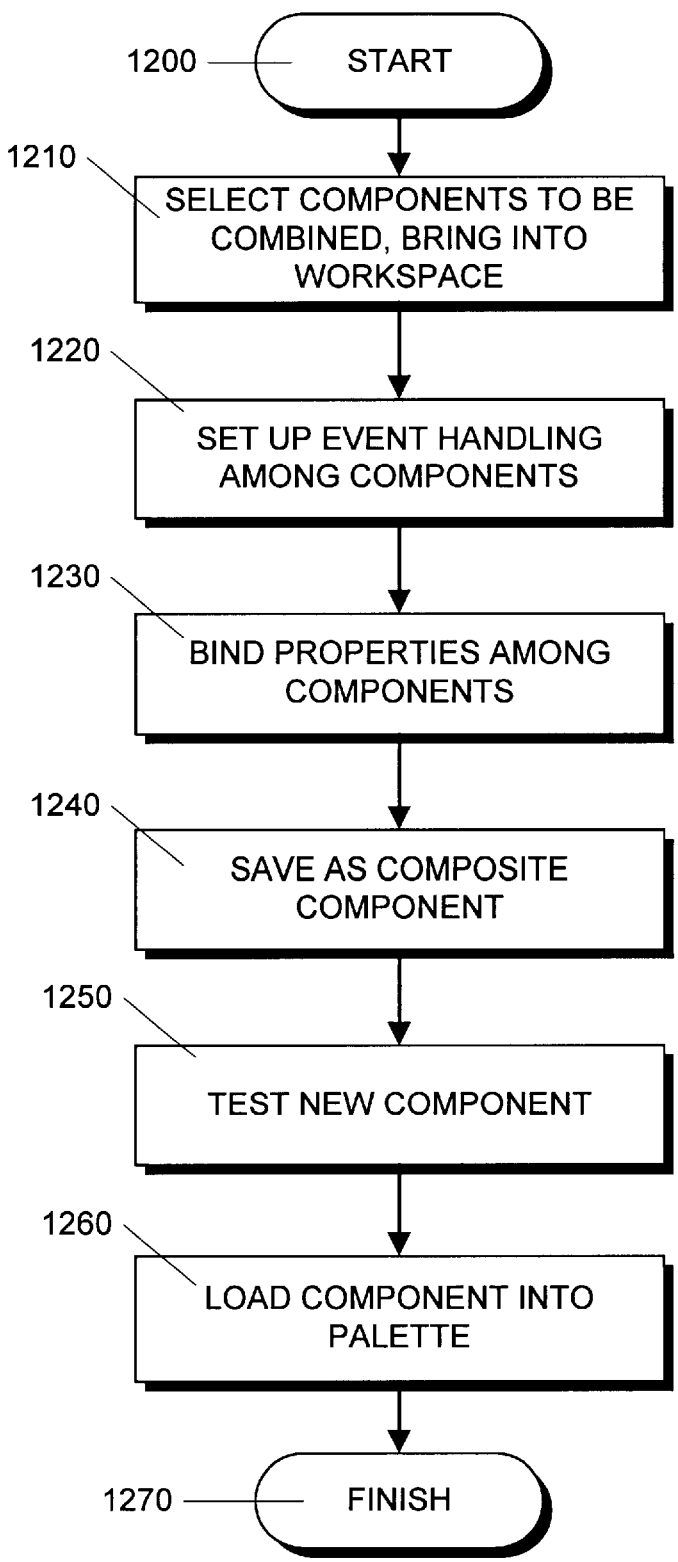
FIG. 12 is a flow chart depicting the steps in a method for creating composite components.

FIG. 12 discloses the overall steps in an illustrative method with which a composite component can be created and added to a visual builder palette using the component, or bean, tester. In general, a composite bean is created by selecting a set of beans and then "wiring" the beans together so that events generated by one bean are responded to by other beans in the composite and selected properties are bound together. Finally, the constructed bean can be tested using the universal transport mechanism discussed above and controlling the universal transport mechanism by the composite bean as will be discussed below.

The method for creating a composite bean starts in step 1200, where it is assumed that the computer 100 is running and the visual builder has been launched and proceeds to step 1210. In step 1210, an operator selects components from the palette 1125 which are to comprise the ultimate composite component. In the illustrative embodiment, the components can be selected from the palette 1125 by holding down the "shift" key and clicking on each component icon in turn from the palette 1125, as desired. The operator then releases the "shift" key and places the mouse cursor over any of the now highlighted component icons, depresses and holds down the mouse button, and "drags" the group of icons into the workspace panel 1140. With the components in the workspace, the user can design and implement a component layout using, for example, alignment icons in the toolbar 1120.

The user can then "wire" the components together to create a single composite component by setting up event handling among the components (step 1220), or by binding properties among components (step 1230.) Depending on the objectives of the creator of the composite component, some or all of the wiring may be done by event handling and some or all of the wiring may by performed by binding properties. These latter steps are discussed in more detail below.

In step 1240, the new component can be saved as a composite component. Step 1240 incorporates the activities of specifying a directory and creating the necessary code files associated with the component.

Once the component has been saved to a directory and associated source code created, the component can be tested as set forth in step 1250. Once the bean operates as desired, the component can be loaded into a palette as set forth in step 1260, so that icon representing the component appears in the palette 1125 for use in creating objects or other composite components. The process then ends in step 1270.

Figure 13:
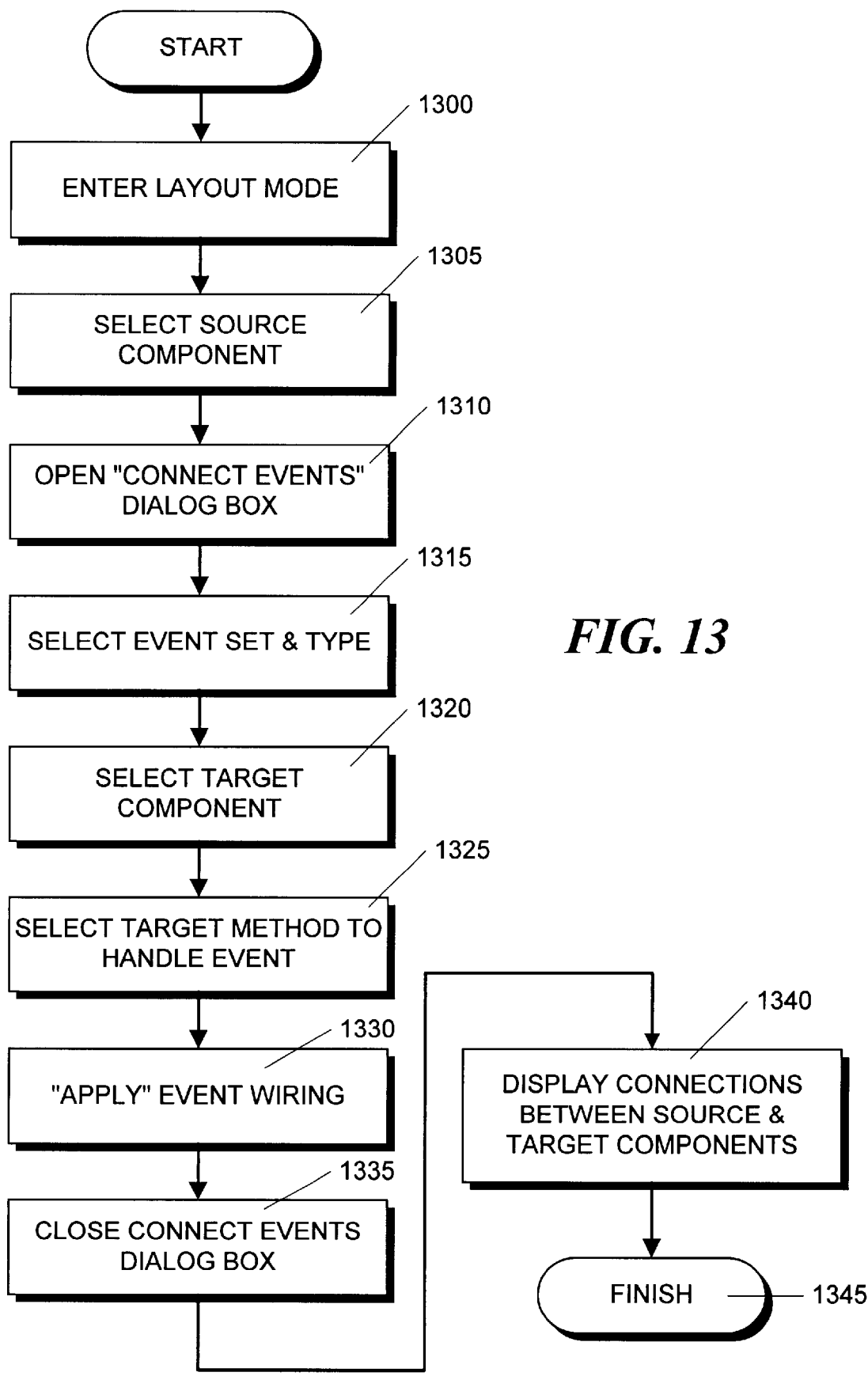
FIG. 13 is a flow chart which depicts steps in a method for setting up event handling between components which exist within a composite component using the Layout mode of the illustrative bean tester.
Figure 14:
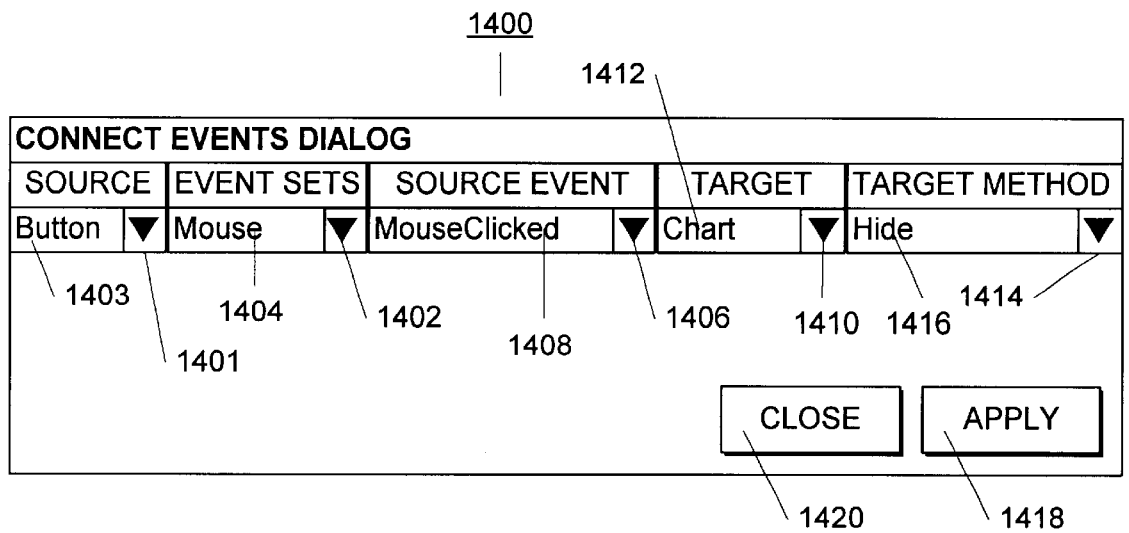
FIG. 14 is a schematic illustration of the screen display of a Connect Events dialog box.
Figure 15:
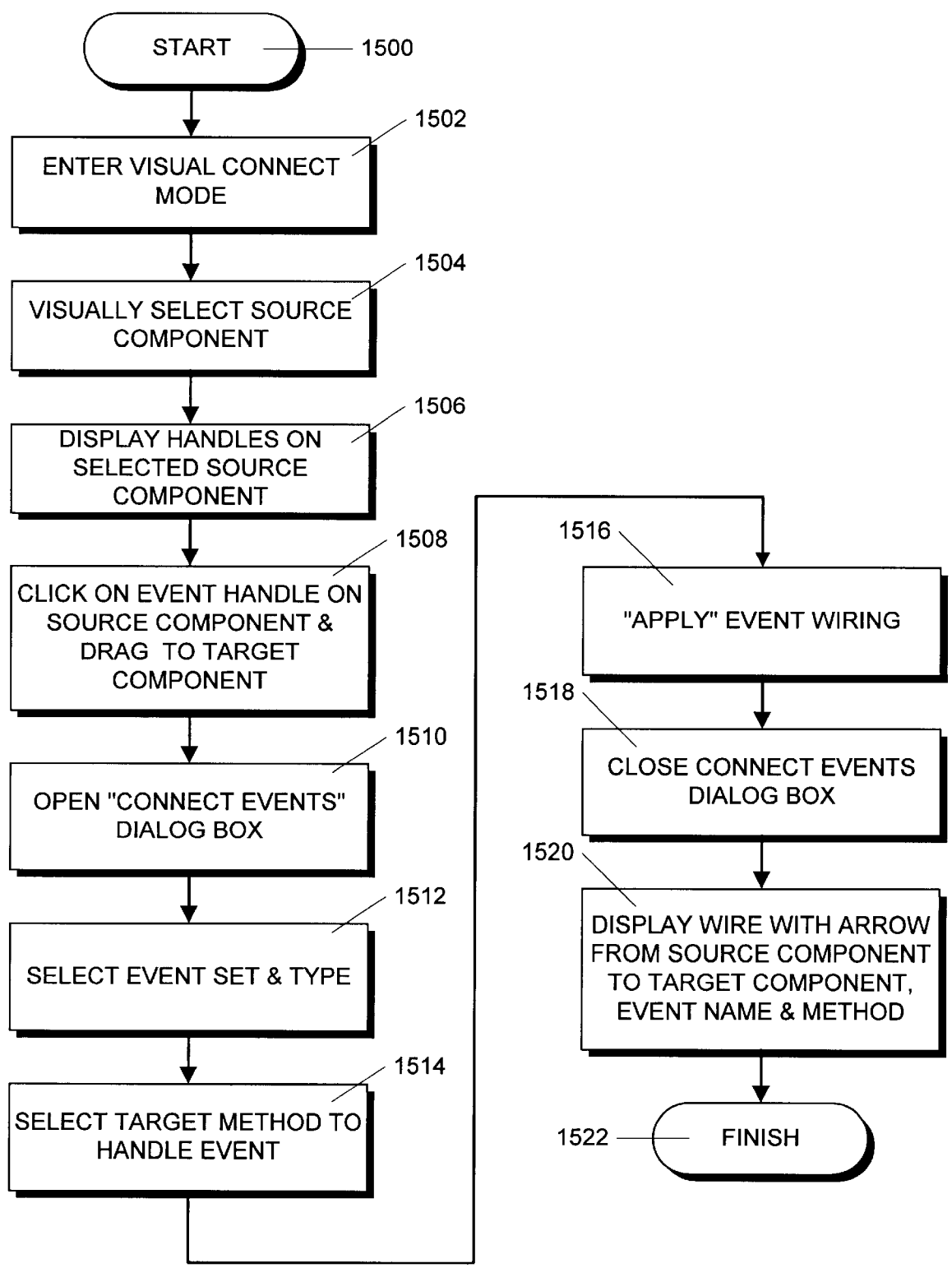
FIG. 15 is a flow chart which depicts steps in a method for setting up event handling between components which exist within a composite component using the Visual Connect mode of the illustrative bean tester.

FIGS. 13, 14 and 15 illustrate screen displays and steps in illustrative methods for handling events among components which exist within a composite bean. These illustrative methods are an expansion of step 1220 of FIG. 12. In the particular illustrative embodiment, event handling can be arranged in either a "Layout" or "Visual Connect" mode. The steps involved in the Layout Mode method are illustrated in FIG. 13, whereas the steps involved in the Visual Connect mode are illustrated in FIG. 15. To establish event handling among components within a composite component in the Layout Mode, the layout mode is first entered by selecting "Layout" from the mode menu, in step 1300. In step 1305, a "source" component is selected by mouse clicking on the icon representing it in the workspace 1140. The source component will include methods to generate event messages. After wiring, these event messages are sent to event listeners, i.e. objects created from "target" components.

Next, in step 1310, a "Connect Events" item is selected from the Connect Menu in order to open a Connect Events dialog box (illustrated in FIG. 14). When the Connect Events dialog box is opened, the source component is displayed in the source component list 1401 (for example, a button component 1403.) The user can also select other source components at this time.

In the Connect Events dialog box 1400, in step 1315, the user can select an event set from a list 1402 of the events generated by the source component (for example, mouse events 1404). Once an event set is selected, the events generated by the device are displayed in the source event list 1406 and the source event type from a list 1406 (for example, mouse clicked 1408),. Next, in step 1320, also from the Connect Events dialog box 1400, the user can select a target component from list 1410 which includes the components represented by icons displayed in the workspace 1140 (for example,. a chart 1412) which can handle events. Next, in step 1325, a target method from list 1414 associated with the target component (for example, a hide method 1416) is selected.

In step 1330, the "Apply" button 1418 located in the Connect Events dialog box 1400 can be selected to complete the wiring of the event. For example, with the selections shown in FIG. 14, when a source button is selected by placing the cursor over the source button and depressing the mouse button, an event notification will be sent to an object created from the target component class. This event notification will cause the target object to hide its display when the mouse is clicked on the button. In step 1335, with the connections now "applied", the "close" button 1420 of the Connect Events dialog box can be selected to close the box and hide its display. In step 1340, "wires" are displayed between the icons in the workspace to visually demonstrate the connections which have just been made.

Referring to FIG. 15, the steps in a method for arranging event handling among components which exist within a composite component using the Visual Connect mode are illustrated. As previously mentioned, this method is an expansion of step 1220 of FIG. 12 and serves as an alternative to the method of FIG. 13. The method starts in step 1500 and proceeds to step 1502 where the user enters the Visual Connect mode by choosing a "Visual Connect" item from the mode menu. The user then selects a source component, in step 1504, from the workspace 1140 by mouse clicking on it. Event "handles" are displayed on the selected source component in step 1506. In the illustrative embodiment, the event handles are displayed as circles on the periphery of the component. An association is created between the source component and a target component in step 1508 when the user clicks on one of the source component event handles, drags the source component to the target component and drops the source component on the target component.

At this point, as set forth in step 1510, the Connect Events dialog box 1400 is opened as previously discussed with the exception that the source component and the target component are already selected when the box opens.

Next, in step 1512, the Connect Events dialog box 1400 is used to select the event set and source event type for the source component using the lists 1402 and 1406 as discussed previously. In step 1514, the target method which will handle the event is selected from list 1414. In step 1516, the event is "wired" by selecting the "Apply" button 1418 from the Connect Events dialog box. The user can then select the "Close" button 1420 in the Connect Events dialog box 1400 to close the box 1400 as set forth in step 1518. In step 1520, in the workspace, "wiring" lines are displayed between the selected components. The method then ends in step 1522.

The visual builder generates an adapter class to implement the event handling. This adapter class contains a method that registers itself as a listener for the selected event in the source bean. Another method in the adapter class invokes the selected method of the target bean when the selected event occurs in the source bean. The event notification mechanism is conventional and will not be discussed in detail hereinafter. When the target bean is a proxy bean, the selected method can be invoked by instantiating the EventMethod class and using the fireMethod( ) method in the universal transport mechanism as discussed above with respect to FIG. 10.

Figure 17:
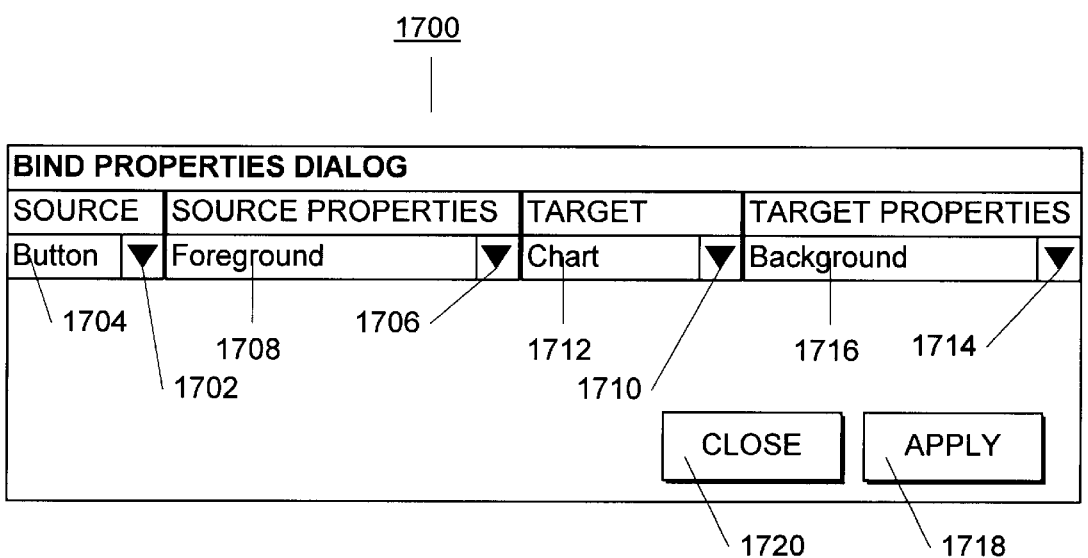
FIG. 17 is a schematic diagram of the screen display of the Bind Event dialog box.
Figure 16:
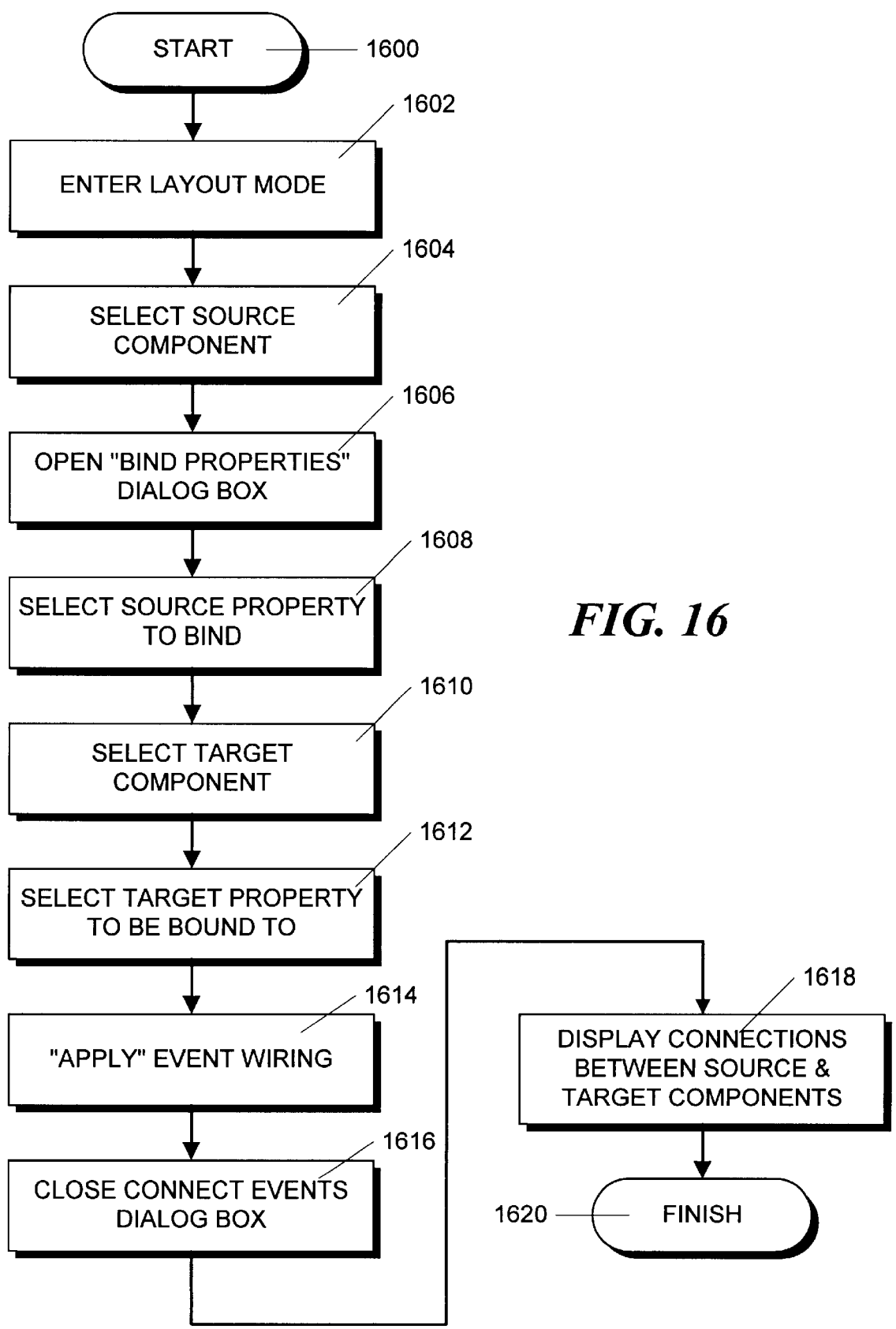
FIG. 16 is a flowchart which depicts the steps in a method for binding properties between components which exist within a composite component using the Layout mode of the illustrative tester.
Figure 18:
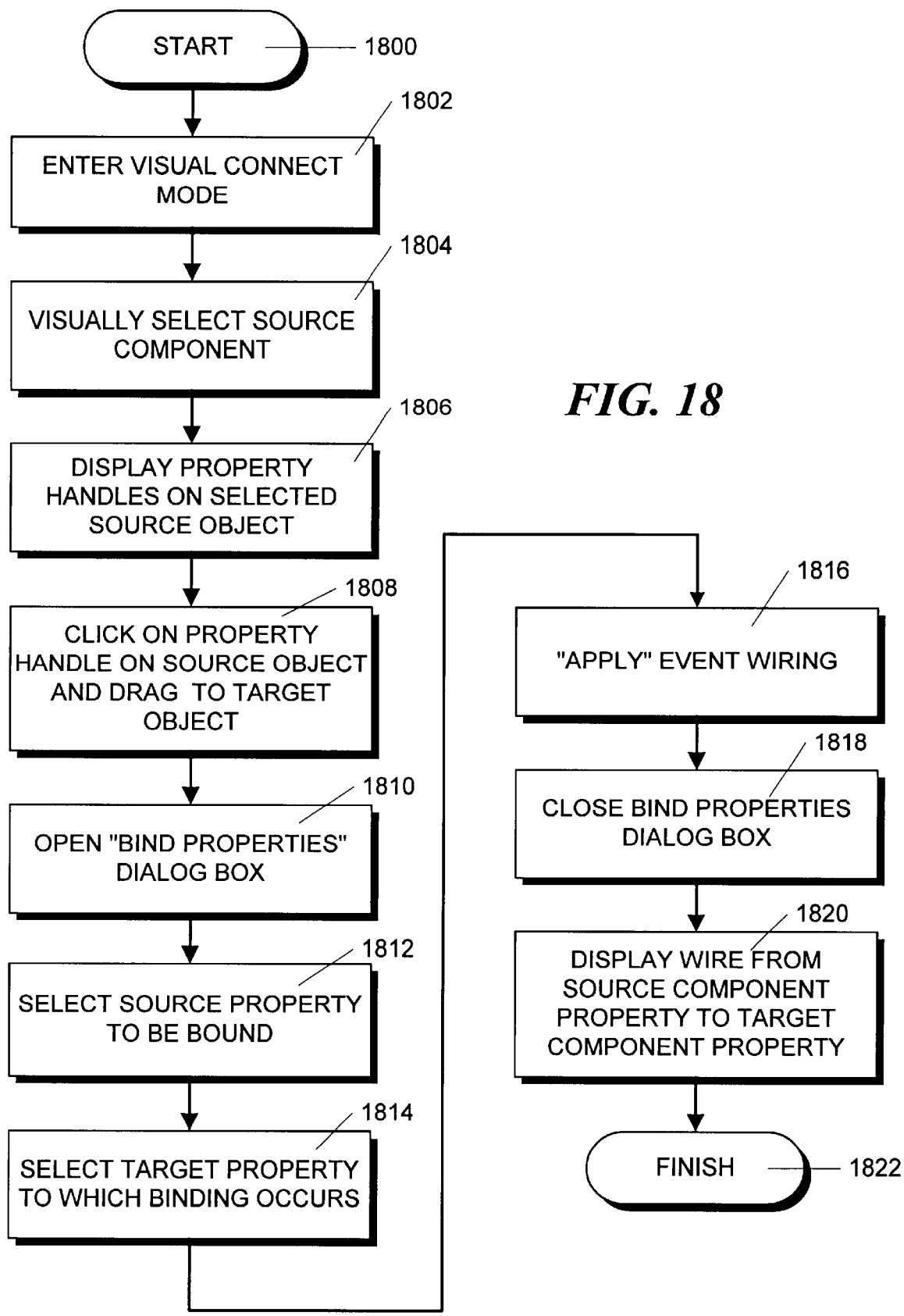
FIG. 18 is a flowchart which depicts the steps in a method for binding properties between components which exist within a composite component using the Visual Connect mode of the illustrative tester.

Referring to FIGS. 16, 17 and 18, a screen display and steps in methods for binding properties between components within a composite component are illustrated. With these methods a first property in one bean can be bound to a second property in another bean so that changes in the first property are automatically propagated across one or more beans. The beans can be of the same type or different types as long as the property has the same value type. As with event handling, the properties can be bound between components in either the "Layout" or "Visual Connect" mode of the illustrative embodiment. FIG. 16 illustrates the steps involved in binding properties in the Layout Mode whereas FIG. 18 illustrates the steps in the Visual Connect Mode. Both methods are alternative expansions of step 1230 in FIG. 12. FIG. 17 illustrates a dialog box display used in the two methods.

The Layout Mode operation is illustrated in FIG. 16 which starts in step 1600 and proceeds to step 1602. To bind properties in the Layout Mode, the "Layout" item is selected from the mode menu, in step 1602. Next, in step 1604, an icon representing the source component is selected from the icons previously dragged into the workspace 1140. In step 1606, a Bind Properties dialog box 1700 (FIG. 17) is opened when a user selects the "Bind Properties" item from the Connect menu. Next, in step 1608, the source property (for example, foreground color 1708) which will be bound is selected from list 1706. In step 1610, the target component (for example, a chart 1712) is selected from the list 1710 which contains a list of the components represented by icons in the workspace 1140. When the target is selected a list of its properties appears in list 1714. With the target component chosen, in step 1612, the target property (for example. background color 1716) to which the source property will be bound is selected.

In step 1614, the "Apply" button 1718 is selected to complete the binding. The Bind Properties dialog box 1700 is closed by selecting the "Close" button 1720 in step 1616. In the workspace 1140, connections are displayed in step 1618 between the source and target components indicate the binding. The method then ends in step 1620. In the particular binding illustrated in FIG. 17 when the foreground color of the source button is changed, for example, the background color of the target chart will also change.

FIG. 18 illustrates the steps in a method for binding properties among components which exist within a composite component using the Visual Connect mode. As previously mentioned, this method is an expansion of step 1230 of FIG. 12 and serves as an alternative to the method of FIG. 16. The method starts in step 1800 and proceeds to step 1802 where the user enters the Visual Connect mode by choosing a "Visual Connect" item from the mode menu. The user then selects a source component, in step 1804, from the workspace 1140 by mouse clicking on it. Event "handles" are displayed on the selected source component in step 1806. In the illustrative embodiment, the event handles are displayed as circles on the periphery of the component. An association is created between the source component and a target component in step 1808 when the user clicks on one of the source component event handles, drags the source component to the target component and drops the source component on the target component.

At this point, as set forth in step 1810, the Bind Properties dialog box 1700 is opened as previously discussed with the exception that the source component and the target component are already selected when the box opens.

Next, in step 1812, the Bind Properties dialog box 1700 is used to select the event set and source event type for the source component using the lists 1702 and 1706 as discussed previously. In step 1814, the target property to be bound is selected from list 1714. In step 1816, the event is "wired" by selecting the "Apply" button 1718 from the Bind Properties dialog box. The user can then select the "Close" button 1720 in the Bind Properties dialog box 1700 to close the box 1700 as set forth in step 1818. In step 1820, in the workspace, "wiring" lines are displayed between the selected components. The method then ends in step 1822.

As previously mentioned, proxy beans encapsulate the parameters of methods as properties. In accordance with the principles of the invention, by binding the properties of method proxy beans to other component properties, it is possible to set and change the method parameters at runtime, and, particularly, during testing. This capability allows for complete testing of the component beans.

Figure 19:
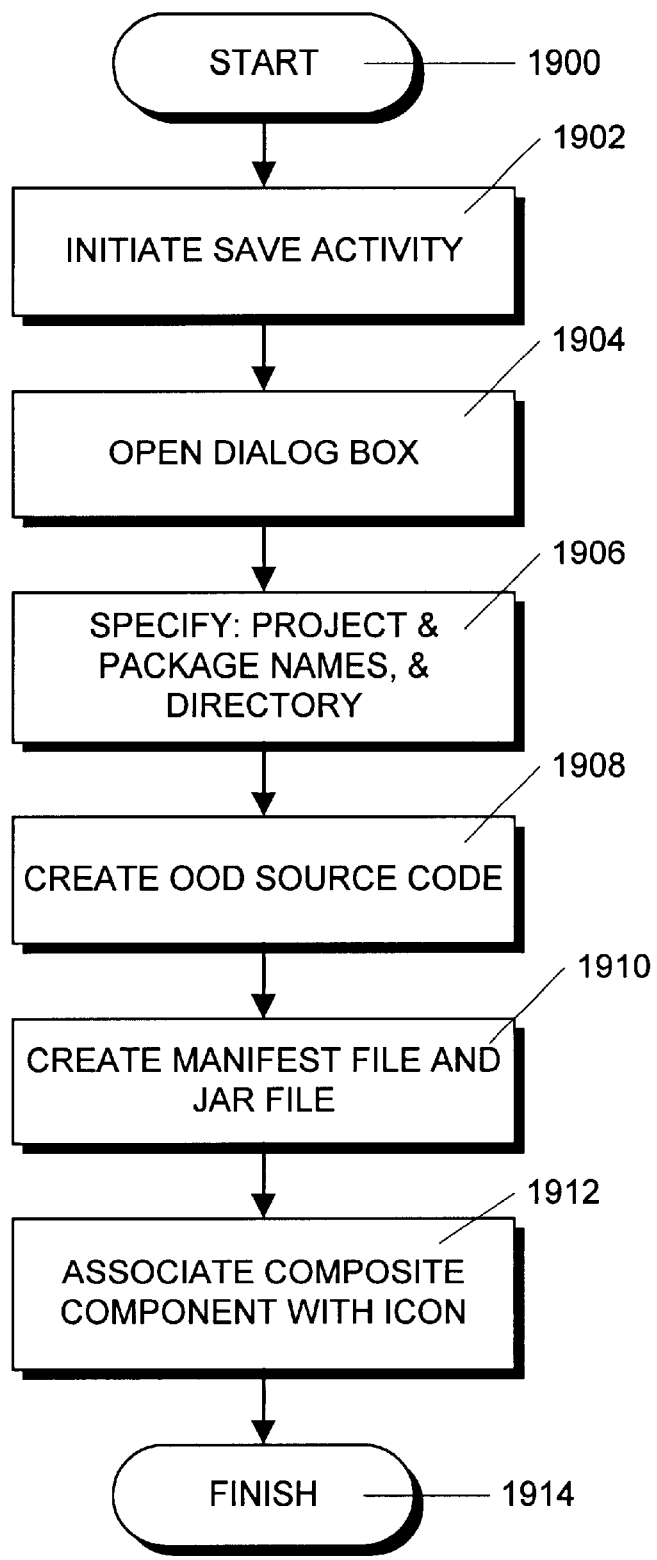
FIG. 19 is a flowchart which depicts the steps in an illustrative method for saving a new composite component and creating the object oriented design files associated with the new component.

FIG. 19 depicts a functional flow of a method for saving a new component in accordance with the illustrative embodiment. The save process includes the process of creating the necessary files associated with the component and expands step 1240 of FIG. 12. The method begins in step 1900 and proceeds to step 1902 where the new component is saved as a composite bean by selecting the "Save As Composite Bean" item from the File menu. Choosing the save command causes a dialog box to be opened as set forth in step 1904. The dialog box prompts the user for necessary information regarding execution of the save command. In step 1906, using the dialog box the user specifies, the project and package names for the new composite component and the directory where the component and related files are to be saved. With that information specified, in step 1908, the bean tester creates the source code for the composite component, and creates manifest and JAR files for the component in step 1910. In step 1920, the composite component is associated with an icon. The process then finishes in step 1914.

Figure 20:
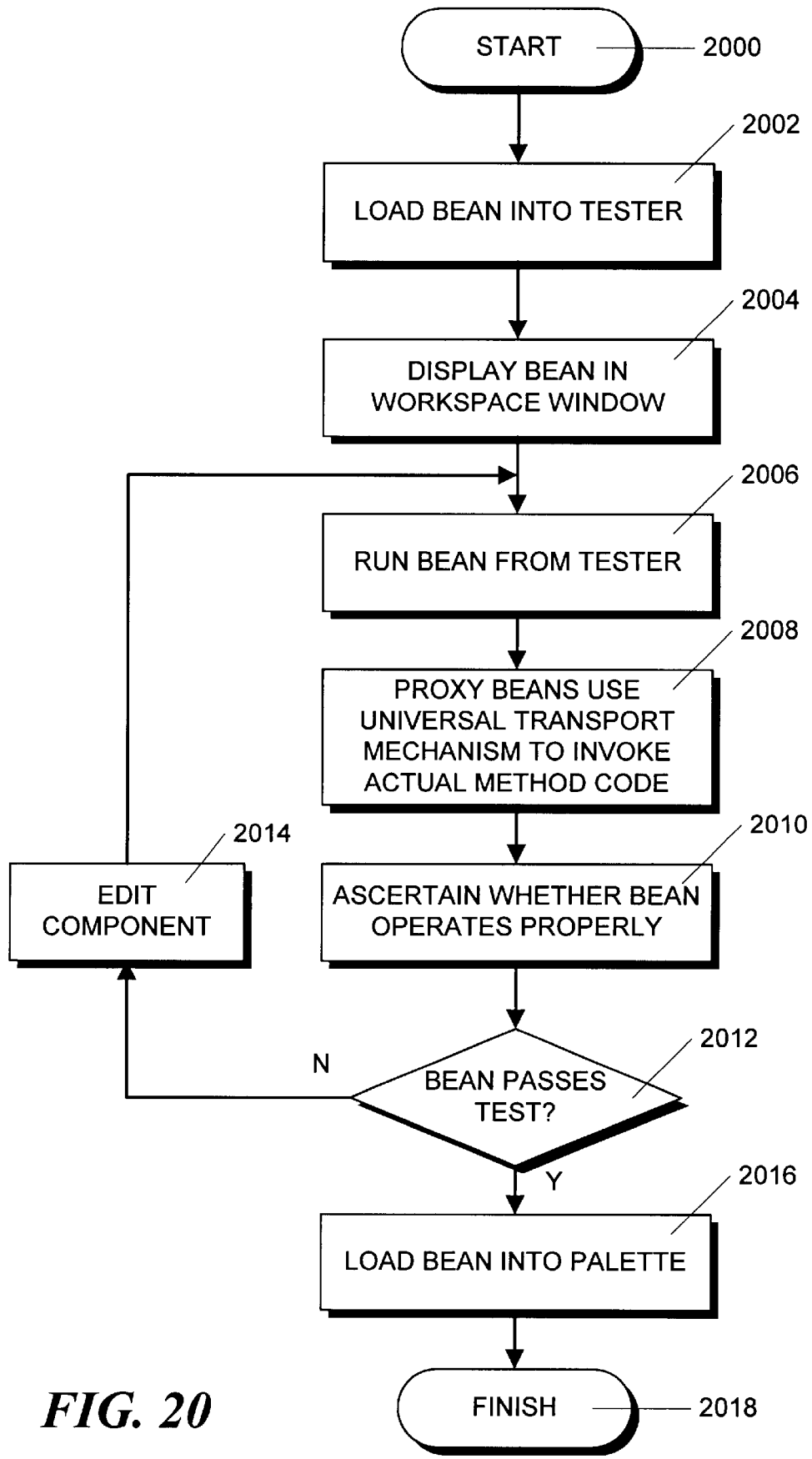
FIG. 20 is a flowchart which depicts the steps in a method for testing components using the illustrative tester.

FIG. 20 discloses a bean testing method which utilizes the aforementioned visual builder. While this method can be a standalone process, it is also representative of an expansion of step 1250 of FIG. 12. The beans to be tested could have been created from a number of different programming means. In any case the bean is processed by the bean compiler 300, discussed earlier in connection with FIG. 3 to create proxy beans for the methods. The proxy beans are then wired together to create a composite bean as discussed above. The composite bean can be tested and then added to a visual builder palette for use in creating objects or other composite beans.

Testing a composite bean typically involves testing the operation of its methods and bound properties, which, as discussed above include the parameters of the methods. In step 2000, the process is started with the assumption that the computer 100 is running, the visual builder application is running, and a user has a bean, which could be a composite bean that is composed of proxy beans, for testing residing in memory and which appears on the palette of the visual builder. In step 2002, the bean to be tested is loaded into the tester described above using the visual environment add-on, also as discussed above.

Next, in step 2004, the bean is displayed in the workspace window by selecting it from the palette. At this point the bean can be edited and modified. In step 2006, the bean can be run by choosing the "Run" item from the tester Mode menu 1110 or by clicking on the Run toolbar button icon in the toolbar 1120. As previously mentioned, when the methods of proxy beans are invoked, they use the universal transport mechanism to invoke the actual component code in order to test the method as set forth in step 2008. Further, as discussed previously, the method parameters of the original bean are exposed by the proxy components created from the methods of that bean. Consequently, each method can be tested fully.

Next, in step 2010, the bean is checked to ascertain if it is operating properly. In some cases the result of the test can be ascertained visually. For example, if the bean responds to an event by running a graphics image, the image should be displayed. In another example, if the bean had bound properties associated with it, like simultaneously changing the background color of objects created from the bean, the bound property could also be tested by selecting and changing the background color of one bean using the bean tester properties panel and then inspecting whether the background color of the other bean with bound properties also changed. In other cases property values must be checked.

In step 2012, if the bean passes the test, the operator may proceed to load the bean into a visual builder palette as set forth in step 2016. The method then finishes in step 2018. If the bean did not pass the test, the operator may then choose to edit the bean as set forth in step 2014. The method then proceeds back to step 2006 where the bean is rerun to retest it.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular language, other object-oriented languages would also be suitable for the invention. Similarly, although a particular hardware system and operating system is described, other hardware and operating system software could be used in the same manner as that described.

Other aspects, such as the specific instructions utilized to achieve a particular function, as well as other modifications to the inventive concept are intended to be covered by the appended claims.

What is claimed is:

1. Apparatus for testing component class code with a visual builder, the apparatus implemented on a computer system having a memory and comprising:
   a parser responsive to the component class code for extracting a method having a parameter;
   a compiler for creating a proxy component from the extracted method, wherein the parameter is expressed as a property of the proxy component;
   visual builder which binds the proxy component property to another property in the component class code; and
   a second mechanism for invoking the method using the value of the proxy component property as the parameter.

2. The apparatus of claim 1 wherein the compiler creates a proxy component from each constructor and method.

3. The apparatus of claim 2 wherein a constructor proxy component includes a constructor and wherein the constructor proxy component is responsive to an invocation of the constructor for instantiating a target object from the component class code.

4. The apparatus of claim 1 wherein the second mechanism comprises a transport mechanism which is responsive to the proxy component for controlling the component class code.

5. The apparatus of claim 4 wherein the proxy component is responsive to an invocation of the method for instantiating an event object encapsulating the method parameter.

6. The apparatus of claim 5 wherein the transport mechanism is responsive to an event object for controlling the component class code.

7. The apparatus of claim 6 wherein exceptions which occur during operation of the method are encapsulated in an exception event object.

8. A method for testing component class code with a visual builder, the apparatus implemented on a computer system having a memory and comprising:
   (a) extracting a method having a parameter from the component class code;
   (b) creating a proxy component from the extracted method, wherein the parameter is expressed as a property of the proxy component;
   (c) binding with the visual builder the proxy component property to another property in the component class code; and
   (d) invoking the method using the value of the proxy component property as the parameter.

9. The method of claim 8 wherein step (b) comprises the step of:
   (b1) creating a proxy component from each constructor and method.

10. The method of claim 9 wherein a constructor proxy component includes a constructor and wherein the method further comprises the step of:
    (e) using the constructor proxy component to instantiate a target object from the component class code in response to an invocation of the constructor.

11. The method of claim 8 wherein step (d) comprises the steps of:
    (d1) invoking the method in the component class code with a transport mechanism which is controlled by the proxy component.

12. The method of claim 11 wherein step (d) further comprises the step of:
    (d2) instantiating an event object encapsulating the method parameter in response to an invocation of the method.

13. The method of claim 12 wherein step (d2) comprises the step of:
    (d3) using the event object to control the component class code.

14. The method of claim 13 further comprising the step of:
    (f) encapsulating exceptions which occur during operation of the method in an exception event object.

15. A computer program product for testing component class code with a visual builder, the apparatus implemented on a computer system having a memory and comprising a computer usable medium having computer readable program code thereon, including:

program code for extracting a method having a parameter from the component class code;

program code for creating a proxy component from the extracted method, wherein the parameter is expressed as a property of the proxy component;

program code incorporated into the visual builder for binding the proxy component property to another property in the component class code; and program code for invoking the method using the value of the proxy component property as the parameter.

16. The computer program product of claim 15 wherein the program code for creating a proxy component comprises program code for creating a proxy component from each constructor and method.

17. The computer program product of claim 16 wherein a constructor proxy component includes a constructor and wherein computer program code further comprises program code for using the constructor proxy component to instantiate a target object from the component class code in response to an invocation of the constructor.

18. The computer program product of claim 15 wherein the program code for invoking the method comprises transport mechanism program code which is controlled by the proxy component for invoking the method in the component class code.

19. The computer program product of claim 18 wherein the program code for invoking the method further comprises program code for instantiating an event object encapsulating the method parameter in response to an invocation of the method.

20. The computer program product of claim 19 wherein the program code for invoking the method comprises program code for using the event object to control the component class code.

21. The computer program product of claim 20 further comprising program code for encapsulating exceptions which occur during operation of the method in an exception event object.

* * * * *